US008751941B1

(12) United States Patent
Kaushik et al.

(10) Patent No.: US 8,751,941 B1
(45) Date of Patent: Jun. 10, 2014

(54) GRAPHICAL USER INTERFACE FOR UNIFIED IDENTITY MANAGEMENT ACROSS INTERNAL AND SHARED COMPUTING APPLICATIONS

(71) Applicant: Identropy, Inc., New York, NY (US)

(72) Inventors: Nishant Kaushik, Jersey City, NJ (US); Francisco Villavicencio, Tenafly, NJ (US); Ashraf Motiwala, Valley Stream, NY (US); Christopher Hydak, Austin, TX (US); Mubdiu Reza Chowdhury, London (GB)

(73) Assignee: Identropy, Inc., New York, NY (US)

( * ) Notice: Subject to any disclaimer, the term of this patent is extended or adjusted under 35 U.S.C. 154(b) by 0 days.

(21) Appl. No.: 13/712,755

(22) Filed: Dec. 12, 2012

Related U.S. Application Data

(60) Provisional application No. 61/671,776, filed on Jul. 15, 2012.

(51) Int. Cl.
G06F 3/00 (2006.01)
G06F 3/048 (2013.01)
G06F 15/177 (2006.01)

(52) U.S. Cl.
USPC ........... 715/745; 715/733; 715/735; 715/741; 715/751; 715/811

(58) Field of Classification Search
None
See application file for complete search history.

(56) References Cited

U.S. PATENT DOCUMENTS

| 7,168,035 B1* | 1/2007 | Bell et al. | 715/234 |
| 7,401,300 B2* | 7/2008 | Nurmi | 715/866 |
| 7,421,655 B2* | 9/2008 | Ikeda et al. | 715/710 |
| 7,657,513 B2* | 2/2010 | Richardson et al. | 707/999.3 |
| 7,870,491 B1* | 1/2011 | Henderson et al. | 715/745 |
| 7,890,886 B2* | 2/2011 | Matthews et al. | 715/809 |
| 8,276,069 B2* | 9/2012 | Chen et al. | 715/700 |
| 8,291,405 B2* | 10/2012 | Buckley et al. | 717/170 |
| 8,316,308 B2* | 11/2012 | Sherman et al. | 715/744 |
| 8,352,868 B2* | 1/2013 | Betts-LaCroix et al. | 715/738 |
| 8,438,185 B2* | 5/2013 | Teranishi et al. | 707/783 |
| 2001/0013029 A1* | 8/2001 | Gilmour | 707/1 |
| 2002/0049806 A1* | 4/2002 | Gatz et al. | 709/203 |

(Continued)

FOREIGN PATENT DOCUMENTS

| EP | 2023582 A1 * | 2/2009 |
| WO | WO0196994 A2 * | 12/2001 |
| WO | WO03032151 A2 * | 4/2003 |

OTHER PUBLICATIONS

William R. Stanek, Managing User Profiles, 1999, 14 pages.*

(Continued)

*Primary Examiner* — Ryan Pitaro
*Assistant Examiner* — Yongjia Pan
(74) *Attorney, Agent, or Firm* — Stephen A. Mason; Meyertons, Hood, Kivlin, Kowert & Goetzel, P.C.

(57) ABSTRACT

A single user interface for a user of an identity management module is presented. The single user interface includes options for transmitting an access management instruction to a customer internal application via an on-premise proxy, and transmitting another access management instruction to a shared computing system application via a multi-customer gateway on the shared computing system. The user interface is adaptively adjusted to highlight suggested access entitlement operations based at least in part upon expected access entitlements derived from a prediction engine.

21 Claims, 19 Drawing Sheets

(56) References Cited

U.S. PATENT DOCUMENTS

| | | | |
|---|---|---|---|
| 2002/0143961 A1* | 10/2002 | Siegel et al. | 709/229 |
| 2003/0066068 A1* | 4/2003 | Gutta et al. | 725/9 |
| 2005/0076367 A1* | 4/2005 | Johnson et al. | 725/58 |
| 2005/0154798 A1* | 7/2005 | Nurmi | 710/1 |
| 2008/0147639 A1* | 6/2008 | Hartman et al. | 707/5 |
| 2009/0327962 A1* | 12/2009 | Betts-LaCroix et al. | 715/833 |
| 2010/0005518 A1* | 1/2010 | Tirpak et al. | 726/6 |
| 2010/0058462 A1* | 3/2010 | Chow | 726/17 |
| 2012/0169457 A1* | 7/2012 | Williamson | 340/5.2 |
| 2012/0310701 A1* | 12/2012 | Llopis et al. | 705/7.29 |

OTHER PUBLICATIONS

Profile 2, Nov. 4, 2009, 2 pages.*

* cited by examiner

GRAPHICAL USER INTERFACE FOR UNIFIED IDENTITY MANAGEMENT ACROSS INTERNAL AND SHARED COMPUTING APPLICATIONS

BACKGROUND

Claim of Priority to Provisional Application

This application claims benefit of priority of U.S. Provisional Application Ser. No. 61/671,776 entitled "Methods and Apparatus for Identity Management" filed Jul. 15, 2012, the content of which is incorporated by reference herein in its entirety.

DESCRIPTION OF THE RELATED ART

As the reach and accessibility of computer networks such as the Internet and corporate networks increase, the amount of information accessible via such networks grows exponentially, creating a concomitant tendency toward increasing ability of systems on those networks to perform a richer and more varied array of functions. For example, as commercial enterprises increasingly embrace a digital workplace, a suite of computer-based systems is being deployed for the management of functions ranging from the delivery of information to the execution of transactions and operation of machinery.

The increase in the number of functions performed by computing machines operating over networks increases the need to provide advanced interfaces to tools for managing access to those computing machines and the networks that connect them. Identity management is the management of individual identities, their authentication, authorization, and privileges/permissions within or across system and enterprise boundaries with the goal of increasing security and productivity while decreasing cost, downtime, and repetitive tasks.

The problems of identity management are compounded by the scale of enterprises, the complexity and variety of resources provided, and the heterogeneity of resource types and environments. Interfaces to tools in the identity management space have yet to fully address the problems created by an increasingly global, increasingly networked work environment with resources deployed on varying networks in varying locations and supporting diverse casts of users.

SUMMARY

Various embodiments of a graphical user interface for unified identity management across internal and shared computing applications are disclosed. In some embodiments, a single user interface for a user of an identity management module is presented. The single user interface includes options for transmitting an access management instruction to a customer internal application via an on-premise proxy, and transmitting another access management instruction to a shared computing system application via a multi-customer gateway on the shared computing system. The user interface is adaptively adjusted to highlight suggested access entitlement operations based at least in part upon expected access entitlements derived from a prediction engine.

Figure 1:
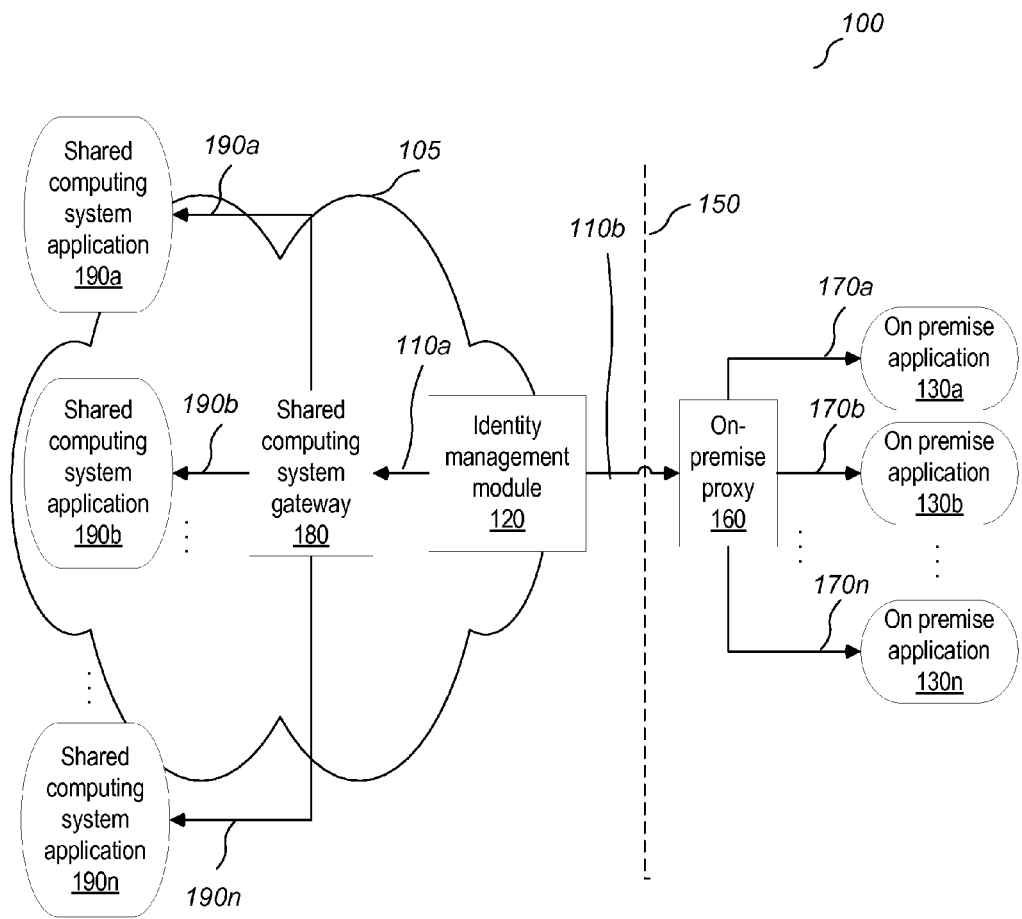
FIG. 1 illustrates a system that may implement identity management, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Some embodiments address the problem of a user interface for managing identities and corresponding access privileges across multiple platforms that include both external (for example, cloud-based) resources and internal (for example, on-premise) resources. In some embodiments, a single user interface for a user of an identity management module is presented. The single user interface includes options for transmitting an access management instruction to a customer internal application via an on-premise proxy, and transmitting another access management instruction to a shared computing system application via a multi-customer gateway on the shared computing system. The user interface is adaptively adjusted to highlight suggested access entitlement operations based at least in part upon expected access entitlements derived from a prediction engine.

Some embodiments of the graphical user interface provide a unified management interface across internal and shared computing applications, thereby allowing a user to create and manage accounts through a single interface for both the on-premise applications and the cloud-based applications used by his or her company without ever having to know or being informed of whether a particular option is executed on the on-premise applications or the cloud-based applications. In some embodiments, one or more processors perform, responsive to receiving a plurality or set of access management requests at an identity management interface, transmitting an access management instruction to a customer internal application via an on-premise proxy, and transmitting another access management instruction to a shared computing system application via a multi-customer gateway on the shared computing system.

Introduction to Computing Terminology

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While some processes or operations described herein are described as being performed by a particular module or modules, one of skill in the art will readily discern in light of having read the present disclosure that such operations or process may be performed by other modules or other computing systems without departing from the scope and intent of the present disclosure. Likewise, while some process are presented as a series of operations and are explained in a particular order, one of skill in the art will readily discern in light of having read the present disclosure that such operations or processes may be performed in an alternative order or combination without departing from the scope and intent of the present disclosure. Embodiments will combine, omit, and substitute modules and the operations that they perform or execute without departing from the scope and intent of the present disclosure. In the discussion contained herein, embodiments are described as performing operations or procedures, which may be taken to mean both performing an operation or procedure directly or supporting that operation or procedure through the processing or preparation of data for that operation or procedure.

Introduction to Performing Adaptive User Interface Functions in Identity Management Various embodiments of methods and apparatus for performing adaptive user interface functions in identity management are disclosed. A user interface is presented to a user of an identity management module. In some embodiments the user interface is a single user interface including options for transmitting an access management instruction to a customer internal application via an on-premise proxy, and transmitting another access management instruction to a shared computing system application via a multi-customer gateway on the shared computing system. In some embodiments, the user interface is adaptively adjusted to highlight suggested access entitlement operations based at least in part upon expected access entitlements derived from a prediction engine.

In some embodiments, a prediction engine is a system for generating a prediction of future activity from a dataset. Some embodiments build a model from a user's past behavior (e.g., options selected) as well as similar decisions made by other users, then use that model to predict items that the user may have an interest in. Prediction engines are also sometimes referred to as recommender systems. One approach to the design of prediction engines that has seen wide use is collaborative filtering. Collaborative filtering methods are based on collecting and analyzing a large amount of information on users' behaviors, activities or preferences and predicting what users will like based on their similarity to other users. A key advantage of the collaborative filtering approach is that it does not rely on machine analyzable content and therefore it is capable of accurately recommending complex items without requiring an "understanding" of the item itself.

Another common approach when designing prediction engines is content-based filtering. Content-based filtering methods are based on information about and characteristics of the items that are going to be recommended. In other words, these algorithms try to recommend items that are similar to those that a user selected in the past (or is examining in the present). In particular, various candidate items are compared with items previously rated by the user and the best-matching items are recommended. In some embodiments, these methods use an item profile (i.e., a set of discrete attributes and features) characterizing the item within the system. The system creates a content-based profile of users based on a weighted vector of item features. The weights denote the importance of each feature to the user and can be computed from individually rated content vectors using a variety of techniques. Simple approaches use the average values of the rated item vector while other sophisticated methods use machine learning techniques such as Bayesian Classifiers, cluster analysis, decision trees, and artificial neural networks in order to estimate the probability that the user is going to select the item. Direct feedback from a user, usually in the form of a selection, can be used to assign higher or lower weights on the importance of certain attributes (using Rocchio Classification or other similar techniques).

Some embodiments apply a hybrid approach, combining collaborative filtering and content-based filtering. Hybrid approaches can be implemented in several ways: by making content-based and collaborative-based predictions separately and then combining them; by adding content-based capabilities to a collaborative-based approach (and vice versa); or by unifying the approaches into one model. These embodiments can also be used to overcome some of the common problems in recommender systems such as cold start and the sparsity problem.

Example prediction engine algorithms include K-Nearest Neighbor, Pearson Correlation and Rocchio Relevance filtering. The k-NN algorithm is a method for classifying objects based on the properties of its closest neighbors in the feature space. In k-NN, an object is classified through a majority vote of its neighbors, with the object being assigned to the class most common amongst its k nearest neighbors (k is a positive integer, typically small). If k=1, then the object is simply assigned to the class of its nearest neighbor. The Pearson Correlation is a measure of the correlation (linear dependence) between two variables X and Y, giving a value between +1 and −1 inclusive. In a social network, such as a list of employees with defined relationships in an identity management system, a particular user's neighborhood with similar taste or interest can be found by calculating the Pearson correlation coefficient. By collecting the preference data of top-N nearest neighbors of a particular user (weighted by similarity), the user's preference can be predicted. Rocchio Relevance filtering makes use of the Vector Space Model and is based on the assumption that most users have a general conception of which items should be denoted as relevant or non-relevant. User feedback (e.g. selections) is used to refine a search query by emphasizing or deemphasizing certain terms. Through feedback, the user's search query is revised to include an arbitrary percentage of relevant and non-relevant terms as a means of increasing the search engine's recall, and possibly the precision as well. The number of relevant and non-relevant terms allowed to enter a query is dictated by a series of weights in the central equation.

In some embodiments, the prediction engine is a learning based prediction engine. Learning based prediction engines take as input empirical data, such as selections by users of entitlement options, and (a) identify (i.e., quantify) complex relationships thought to be features of the underlying mechanism that generated the data, and (b) employ these identified patterns to make predictions based on new data. Data can be seen as instances of the possible relations between observed variables; the algorithm acts as a machine learner which studies a portion of the observed data (called examples of the data or training data) to capture characteristics of interest of the data's unknown underlying probability distribution, and employs the knowledge it has learned to make intelligent decisions based on new input data.

Some embodiments use a supervised-learning based prediction engine that generates a function that maps inputs to desired outputs (also called labels, because they are often provided by human experts labeling the training examples). For example, some embodiments approximate a function mapping a vector into classes by looking at input-output examples of the function. Some embodiments use an usupervised-learning based prediction engine that finds hidden structure in unlabeled data (e.g., using clustering, k-means, mixture models, or hierarchical clustering). Some embodiments use neural network models, such as the self-organizing map (SOM) and adaptive resonance theory (ART). The SOM is a topographic organization in which nearby locations in the map represent inputs with similar properties. The ART model allows the number of clusters to vary with problem size and lets the user control the degree of similarity between members of the same clusters by means of a user-defined constant called the vigilance parameter. ART networks are also used for many pattern recognition tasks, such as automatic target recognition and seismic signal processing.

In some embodiments, the adaptively adjusting the user interface to highlight suggested access entitlement operations further includes adaptively adjusting the user interface based at least in part upon user identity and past behavior. In some embodiments, the adaptively adjusting the user interface to highlight suggested access entitlement operations further comprises adaptively adjusting the user interface such that, when the user clicks on suggestions, in the access request interface, the recommendation engine determines, based on the end user's identity data, as well as behavioral patterns over the last interactions, who are the most likely users for which the end user (the requester) may want to request access. Some embodiments use a semi-supervised-learning based prediction engine that combines both labeled and unlabeled examples to generate an appropriate function or classifier. Some embodiments use a reinforcement based-learning based prediction engine that learns how to act given an observation of the world. Every action has some impact in the environment, and the environment provides feedback in the form of rewards that guides the learning algorithm. Some embodiments use a transduction based-learning based prediction engine.

In some embodiments, the adaptively adjusting the user interface to highlight suggested access entitlement operations further includes the presenting the single user interface including the options for transmitting the access management instruction to the customer internal application via the on-premise proxy, and the transmitting the another access management instruction to the shared computing system application via the multi-customer gateway on the shared computing system further includes presenting the user interface in a platform-agnostic fashion such that user controls do not inform a user of the single user interface as to whether a particular option invokes transmission to a shared computing system or a customer internal application.

In some embodiments, the adaptively adjusting the user interface to highlight suggested access entitlement operations based at least in part upon expected access entitlements derived from a prediction engine further includes adaptively adjusting the user interface to highlight suggested access entitlement operations based on a neural networks prediction engine accessing runtime-data to make predictions based on changes in usage patterns.

In some embodiments, the adaptively adjusting the user interface to highlight suggested access entitlement operations based at least in part upon expected access entitlements derived from a prediction engine further includes presenting a next selected operation based on patterns in an identity management access database discerned by a learning-based prediction engine. In some embodiments, the adaptively adjusting the user interface to highlight suggested access entitlement operations based at least in part upon expected access entitlements derived from a prediction engine further includes presenting a next selected operation based on auditing an identity management access database using a learning-based prediction engine to assess priority of operations that can be performed by a user of the user interface.

Some embodiments may include a means for adaptive user interface functions in identity management. For example, an identity management module may present a user interface, as described herein. In some embodiments the user interface presented by the identity management module is a single user interface including options for transmitting an access management instruction to a customer internal application via an on-premise proxy, and transmitting another access management instruction to a shared computing system application via a multi-customer gateway on the shared computing system. In some embodiments, the user interface presented by the identity management module is adaptively adjusted to highlight suggested access entitlement operations based at least in part upon expected access entitlements derived from a prediction engine.

The non-uniform identity management module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting a user interface, as described herein. In some embodiments the user interface is a single user interface including options for transmitting an access management instruction to a customer internal application via an on-premise proxy, and transmitting another access management instruction to a shared computing system application via a multi-customer gateway on the shared computing system. In some embodiments, the user interface is adaptively adjusted to highlight suggested access entitlement operations based at least in part upon expected access entitlements derived from a prediction engine. Other embodiments of the identity management module may be at least partially implemented by hardware circuitry and/or firmware stored, for example, in a non-volatile memory.

Introduction to Integrated Interface for a Unified Management Interface Across Internal and Shared Computing Applications Various embodiments of methods and apparatus for a unified management interface across internal and shared computing applications are disclosed. In some embodiments, one or more processors perform, responsive to receiving a plurality of access management requests at an identity management interface, transmitting an access management instruction to a customer internal application via an on-premise proxy, and transmitting another access management instruction to a shared computing system application via a multi-customer gateway on the shared computing system.

In some embodiments, the transmitting the access management instruction to the customer internal application further includes transmitting the access management instruction from an identity management module to the on-premise proxy. The transmitting the another access management instruction to the shared computing system application further includes transmitting the access management instruction from the identity management module to the multi-customer gateway. The identity management module is located external to a firewall. The on-premise proxy and the customer internal application are located internal to the firewall. The shared computing system application and the multi-customer gateway on the shared computing system are located external to the firewall.

In some embodiments, the shared computing system and the customer internal application are monitored for fulfillment of the access management instruction and the another access management instruction.

In some embodiments, the shared computing system and the customer internal application are monitored for fulfillment of the access management instruction and the another access management instruction. A present problem is diagnosed based at least in part on a failure of fulfillment of the access management instruction or the another access management instruction. A correction to the problem is suggested.

In some embodiments, the shared computing system and the customer internal application are monitored for fulfillment of the access management instruction and the another access management instruction as well as patterns of access management instructions and fulfillments. A present problem is diagnosed based on a pattern of failures of access management instruction and fulfillments. A correction to the problem is suggested.

In some embodiments, the shared computing system and the customer internal application are monitored for fulfillment of the access management instruction and the another access management instruction as well as patterns of access management instructions and fulfillments. A future problem is predicted based at least in part on a pattern of failures of access management instruction and fulfillments. A correction to the problem is suggested. In some embodiments, the diagnosing, predicting or suggesting further includes diagnosing, predicting or suggesting based at least in part on a neural networks prediction engine accessing runtime-data to make predictions based on changes in usage patterns.

Some embodiments may include a means for unified management interface across internal and shared computing applications. For example, an identity management module may, responsive to receiving a plurality of access management requests at an identity management interface, perform transmitting an access management instruction to a customer internal application via an on-premise proxy, and transmitting another access management instruction to a shared computing system application via a multi-customer gateway on the shared computing system, as described herein.

The identity management module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform, responsive to receiving a plurality of access management requests at an identity management interface, transmitting an access management instruction to a customer internal application via an on-premise proxy, and transmitting another access management instruction to a shared computing system application via a multi-customer gateway on the shared computing system, as described herein. Other embodiments of the identity management module may be at least partially implemented by hardware circuitry and/or firmware stored, for example, in a non-volatile memory.

Introduction to Suggesting Access Entitlement Operations Based at Least in Part Upon the Expected Access Entitlements Various embodiments of methods and apparatus for suggesting access entitlement operations based at least in part upon the expected access entitlements are disclosed. In some embodiments, an identity management access database is exposed to a prediction engine. Expected access entitlements of an identity are predicted in response to discovery of patterns in the identity management access database. Access entitlement operations are suggested based at least in part upon the expected access entitlements.

In some embodiments, the suggesting access entitlement operations based upon the expected access entitlements further comprises modifying a graphical user interface to highlight suggested access entitlement operations based at least in part upon the expected access entitlements. In some embodiments, the suggesting access entitlement operations based upon the expected access entitlements further includes suggesting modifications to an existing role based at least in part upon the expected access entitlements. In some embodiments, the suggesting access entitlement operations based upon the expected access entitlements further includes suggesting modifications to an existing identity based at least in part upon the expected access entitlements.

In some embodiments, the suggesting access entitlement operations based upon the expected access entitlements further includes auditing existing identities to detect anomalies based at least in part upon the expected access entitlements. In some embodiments, the suggesting access entitlement operations based upon the expected access entitlements further comprises suggesting access entitlement operations based upon changes to usage patterns in the access entitlements of existing users. In some embodiments, the exposing the identity management access database to a prediction engine further comprises facilitating prediction of access entitlements based at least in part on runtime changes by exposing the identity management access database to a runtime-learning neural networks based prediction engine.

Some embodiments may include a means for suggesting access entitlement operations based at least in part upon the expected access entitlements. For example, an identity management module may expose an identity management access database to a prediction engine, expected access entitlements of an identity are predicted in response to discovery of patterns in the identity management access database and access entitlement operations are suggested based at least in part upon the expected access entitlements, as described herein.

The identity management module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform exposing an identity management access database to a prediction engine, predicting expected access entitlements of an identity in response to discovery of patterns in the identity management access database and suggesting access entitlement operations are suggested based at least in part upon the expected access entitlements, as described herein. Other embodiments of the identity management module may be at least partially implemented by hardware circuitry and/or firmware stored, for example, in a non-volatile memory.

Example Implementations

FIG. 1 illustrates a system that may implement identity management, according to some embodiments. Identity management is the management of user individual identities, their authentication, authorization, and privileges/permissions within or across system and enterprise boundaries with the goal of increasing security and productivity while decreasing cost, downtime, and repetitive tasks. A typical problem of identity management is creating the accounts on various systems for a new employee or adjusting the access privileges of those accounts as the role or roles of the employee change.

In one embodiment, an identity management ecosystem 100 includes (customer internal) on-premise applications 130a-130n and shared computing system (cloud) applications 140a-140n that are managed that are managed by an identity management module 120. Note that, as used herein, 'n' represents a flexibly variable quantity of elements, and the presence of differently numbered devices bearing the same reference letter (e.g., 102a and 100a), does not necessarily indicate a correspondence or interaction between differently numbered devices bearing the same reference letter. Further, the recurrence of 'n' as an alphabetical designator does not indicate that multiple flexibly variable quantities of devices are equal. Nor does the designation of a single member of such a plurality as 'n' indicate that it necessarily corresponds to an 'nth' member of a different plurality, though they may correspond. This convention is employed in order to reduce confusion in the drawings. An example of a typical identity management problem might be the addition of a new doctor in a hospital. Such a doctor might need access to customer internal systems represented by on-premise applications 130a-130n.

Examples of such internal systems might be building security (e.g., the activation of an identification badge to open doors in the hospital), payroll and benefits, and shift scheduling. At the same time, the doctor might also require access to off-premise shared computing system (cloud) applications 140a-140n such as insurance billing systems, pharmacy prescribing systems, and centralized medical records. Identity management module 120 may support user management by a help/service desk, as in creation, deletion, modification of user identity data by a staffed desk to provide the hypothetical doctor with required access. Alternatively or additionally, identity management module 120 may support user self service, as in a user being able to modify one's own mutable or correctable data—e.g. postal address, telephone number, and more importantly and frequently, one's own credentials. Credentials are the, typically, secret piece of information that allows a user to identify himself or herself to the identity management system.

Identity management module 120 receives a plurality of access management requests at an identity management interface. These access management requests include creation, deletion, modification of user identity data and granting or removal of privileges to various systems. In some embodiments, some access management requests are role based, which is to say that the access privileges associated with a particular user are based on a role associated with the user.

For example, identity management module 120 may receive an access management request at an identity management interface to create a new user who is identified in the 'doctor' role, with access privileges, such as prescribing, medical records, scheduling, billing, physical building access, and benefits assigned to that role as described above. Alternatively, identity management module 120 may receive an access management request at an identity management interface to create a new user who is identified in the 'nurse' role, with access privileges, such as medical records, scheduling, physical building access, and benefits assigned to the role, but prescribing and billing withheld. Other examples of access management requests supported by embodiments include changing the role or roles of a user, making individual modifications outside those typically assigned with to a role, or updating a role to apply updates to all users having that role.

In some embodiments, some access management requests facilitate role-based delegated user administration, which involves, as an example, a supervisor of an employee being able to modify certain attributes of an employee's user data. In some embodiments, delegation allows for scaling of an identity management solution in that local administrators with access to identity management module 120 or supervisors with access to identity management module 120 are able to perform permissible modifications without requiring authorization from a global administrator. Roles-based aspects allow for the supervisor to be a role in such embodiments, as opposed to a specific person. Role-based access mechanisms also allow for implementation of privacy controls around user attribute data. In some embodiments, identity management module 120 may handle through access management requests provisioning resources, as in the assignment of a desk or a phone to a new employee in an office.

In response to receiving the plurality of access management requests at the identity management interface, identity management module 120 transmits access management instructions across customer firewall 150 using connector 110*b* and connectors 170*a*-170*n* to customer internal applications 130*a*-130*n* via an on-premise proxy 160. Identity management module 120 transmits other access management instructions to a shared computing system 105 (e.g., a cloud) and shared computing system applications 140*a*-140*n* via a multi-customer shared computing system gateway 180 on the shared computing system 105 using connectors 190*a*-190*n* and connector 110*a*.

As described below with reference to FIGS. 11-16, a user interface is presented to a user of identity management module 120. In some embodiments the user interface is a single user interface including options for transmitting access management instructions to (customer internal) on-premise applications 130*a*-130*n* via on-premise proxy 160, and transmitting other access management instructions to a shared computing system (cloud) applications 140*a*-140*n* via multi-customer shared computing system gateway 180 on the shared computing system 105. In some embodiments, the user interface is adaptively adjusted to highlight suggested access entitlement operations based at least in part upon expected access entitlements derived from a prediction engine.

In some embodiments, an identity management access database is exposed to a prediction engine by identity management module 120. Expected access entitlements of an identity are predicted by identity management module 120 in response to discovery of patterns in the identity management access database. Access entitlement operations are suggested by identity management module 120 based at least in part upon the expected access entitlements.

In some embodiments, identity management module 120 transmits the access management instructions to the customer internal applications (on premise applications 130*a*-130*n*) by transmitting the access management instructions from the identity management module 120 to the on premise proxy 160, and transmits other access management instructions to the shared computing system applications 140*a*-140*n* by transmitting the access management instructions from the identity management module 120 to the multi-customer gateway (shared computing system gateway 180). In some embodiments, a firewall 150 separates identity management module 120 and shared computing system applications 140*a*-140*n* from on-premise applications 130*a*-130*n* such that the identity management module 120 is located external to the firewall 150. The on-premise proxy 160 and the customer internal applications (on premise applications 130*a*-130*n*) are located internal to the firewall 150. The shared computing system applications 140*a*-140*n* and the multi-customer gateway (shared computing system gateway 180) on the shared computing system (cloud 105) are located external to the firewall 150.

In some embodiments, identity management module 120 monitors the shared computing system (cloud 105 or one or more of shared computing system applications 140*a*-140*n*) and the customer internal application (on premise applications 130*a*-130*n*) for fulfillment of access management instructions. In some embodiments, identity management module 120 diagnoses a present problem based at least in part on a failure of fulfillment of the access management instructions and suggests a correction to the problem. In some embodiments, identity management module 120 monitors the shared computing system (cloud 105 or one or more of shared computing system applications 140*a*-140*n*) and the customer internal application (on premise applications 130*a*-130*n*) for fulfillment of access management instructions as well as patterns of access management instructions and fulfillments. In some embodiments, identity management module 120 diagnoses a present problem based at least in part on a pattern of failures of access management instruction and fulfillments and suggests a correction to the problem.

In some embodiments, identity management module 120 monitors the shared computing system (cloud 105 or one or more of shared computing system applications 140*a*-140*n*) and the customer internal application (on premise applications 130*a*-130*n*) for fulfillment of access management instructions as well as patterns of access management instructions and fulfillments. In some embodiments, identity management module 120 predicts a future problem based at least in part on a pattern of failures of access management instruction and fulfillments and suggests a correction to the problem.

In some embodiments, the predicting includes predicting based at least in part on a neural networks prediction engine accessing runtime-data to make predictions based on changes in usage patterns.

Figure 2:
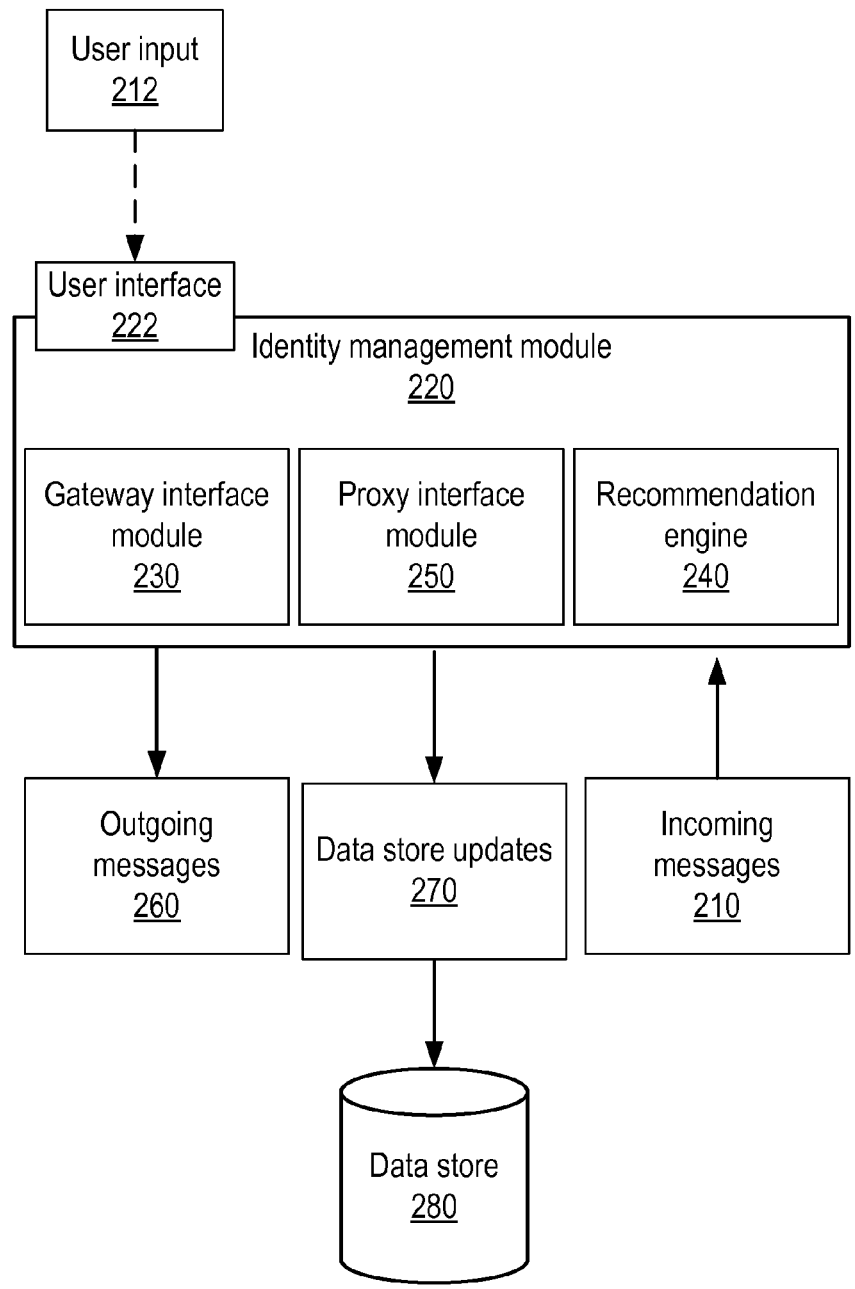
FIG. 2 depicts a module that may implement identity management, according to some embodiments.

FIG. 2 depicts a module that may implement identity management, according to some embodiments, which may implement one or more of the identity management techniques and tools illustrated in FIGS. 3-16 or variously described herein. Identity management module 220 may, for example, implement one or more of a tool for unified management interface across internal and shared computing applications, an adaptive user interface, or a tool for access entitlement operations based at least in part upon the expected access entitlements. FIG. 17 illustrates an example computer system on which embodiments of identity management module 220 may be implemented.

Identity management module 220 receives as input one or more incoming messages 210. Incoming messages may be received from user shared computing system applications across connectors by means of a shared computing system gateway or from on-premise applications across connectors by means of an on-site proxy, as described above with respect to FIG. 1. An example incoming message is a message indicating fulfillment of an access management instruction.

Identity management module 220 may receive user input 212 including access management requests. Identity management module 220 then transmits an access management instruction as an outgoing message 260 to a customer internal application via an on-premise proxy, and transmits another access management instruction to a shared computing system application as an outgoing message 260 via a multi-customer gateway on the shared computing system, according to user input 212 received via user interface 222, which may execute on a diverse assortment of physical computing platforms that include devices ranging from mobile computing platforms (phones, tablets, laptop computers) to fixed computing platforms such as desktop computers and virtual sessions on shared computing systems. Identity management module 220 generates as output one or more data store updates 230. Data store updates 270 may, for example, be stored to a data store 280, such as an identity management access database stored on system memory, a disk drive, DVD, CD, etc. In response to user input 212 including access management requests received at user interface 222, a proxy interface module 230 performs transmitting an access management instruction to a customer internal application via an on-premise proxy, and a gateway interface module performs transmitting another access management instruction to a shared computing system application via a multi-customer gateway on the shared computing system.

User interface 222 presents a user interface to a user of an identity management module. Examples of such a user interface are illustrated below with respect to FIGS. 11-16. In some embodiments, the user interface is a single user interface including options for transmitting using proxy interface module 250 an access management instruction as an outgoing message 260 to a customer internal application via an on-premise proxy, and transmitting via gateway interface module 230 another access management instruction as an outgoing message 260 to a shared computing system application via a multi-customer gateway on the shared computing system. In some embodiments, user interface 222 is adaptively adjusted to highlight suggested access entitlement operations based at least in part upon expected access entitlements derived from a prediction engine interacting with data store 280.

In some embodiments, an identity management access database, such as data store 280 is exposed to a prediction engine, such as recommendation engine 240. Expected access entitlements of an identity or role are predicted by recommendation engine 240 in response to discovery of patterns in the identity management access database, such as data store 280. Access entitlement operations are suggested by recommendation engine 240 based at least in part upon the expected access entitlements.

In some embodiments, user interface 222 adaptively adjusts the user interface based at least in part upon user identity and past behavior. In some embodiments, user interface 222 adaptively adjusts the user interface such that, when the user clicks on suggestions, in the access request interface, the recommendation engine determines, based on the end user's identity data, as well as behavioral patterns over the last interactions, who are the most likely users for which the end user (the requester) may want to request access. In some embodiments, user interface 222 presents the single user interface including the options for transmitting the access management instruction to the customer internal application via the on-premise proxy, and the transmitting the another access management instruction to the shared computing system application via the multi-customer gateway on the shared computing system in a platform-agnostic fashion such that user controls do not alert or inform a user of the single user interface as to whether a particular option invokes transmission to a shared computing system or a customer internal application.

In some embodiments, user interface 222 adaptively adjusts the user interface to highlight suggested access entitlement operations based on a neural networks prediction engine embodied by recommendation engine 240 accessing runtime-data from data store 280 to make predictions based on changes in usage patterns. In some embodiments, user interface 222 presents a next selected operation based on patterns in identity management access database discerned by a learning-based prediction engine. In some embodiments, user interface 222 presents a next selected operation based on auditing an identity management access database using a learning-based prediction engine to assess priority of operations that can be performed by a user of the user interface.

In some embodiments, user interface 222 performs modifying a graphical user interface to highlight suggested access entitlement operations based at least in part upon the expected access entitlements as received from recommendation engine 240. In some embodiments, recommendation engine 240 suggests modifications to an existing role based at least in part upon the expected access entitlements. In some embodiments, recommendation engine 240 suggests modifications to an existing identity based at least in part upon the expected access entitlements. In some embodiments, recommendation engine 240 audits existing identities to detect anomalies based at least in part upon the expected access entitlements. In some embodiments, recommendation engine 240 suggests access entitlement operations based upon changes to usage patterns in the access entitlements of existing users reflected in data store 280. In some embodiments, recommendation engine 240 predicts access entitlements based at least in part on runtime changes by exposing the identity management access database to a runtime-learning neural networks based prediction engine.

In some embodiments, proxy interface module 250 performs the transmitting the access management instruction as an outgoing message 260 to a customer internal application by transmitting the access management instruction from an identity management module to the on premise proxy. In some embodiments, gateway interface module 230 performs the transmitting the another access management instruction to the shared computing system application by transmitting the access management instruction as an outgoing message 260 from the identity management module 220 to the multi-customer gateway. In the identity management module is located external to a firewall of a customer, and the on-premise proxy and the customer internal application are located internal to the firewall. The shared computing system application and the multi-customer gateway on the shared computing system are located external to the customer firewall.

In some embodiments, recommendation engine 240 monitors the shared computing system and the customer internal application via incoming messages 210 for fulfillment of the access management instruction and the another access management instruction. In some embodiments, recommendation engine 240 monitors the shared computing system and the customer internal application for fulfillment of the access management instruction and the another access management instruction, diagnoses a present problem based at least in part on a failure of fulfillment of the access management instruction or the another access management instruction, and suggests a correction to the problem.

In some embodiments, recommendation engine 240 monitors the shared computing system and the customer internal application via incoming messages 210 for fulfillment of the access management instruction and the another access management instruction as well as patterns of access management instructions and fulfillments, diagnoses a present problem based at least in part on a pattern of failures of access management instruction and fulfillments, and suggests a correction to the problem.

In some embodiments, recommendation engine 240 monitors the shared computing system and the customer internal application via incoming messages 210 for fulfillment of the access management instruction and the another access management instruction as well as patterns of access management instructions and fulfillments, predicts a future problem based at least in part on a pattern of failures of access management instruction and fulfillments, and suggests a correction to the problem. In some embodiments, diagnosing, predicting or suggesting by recommendation module 240 include diagnosing, predicting or suggesting based at least in part on a neural networks prediction engine accessing runtime-data to make predictions based on changes in usage patterns.

Figure 3:
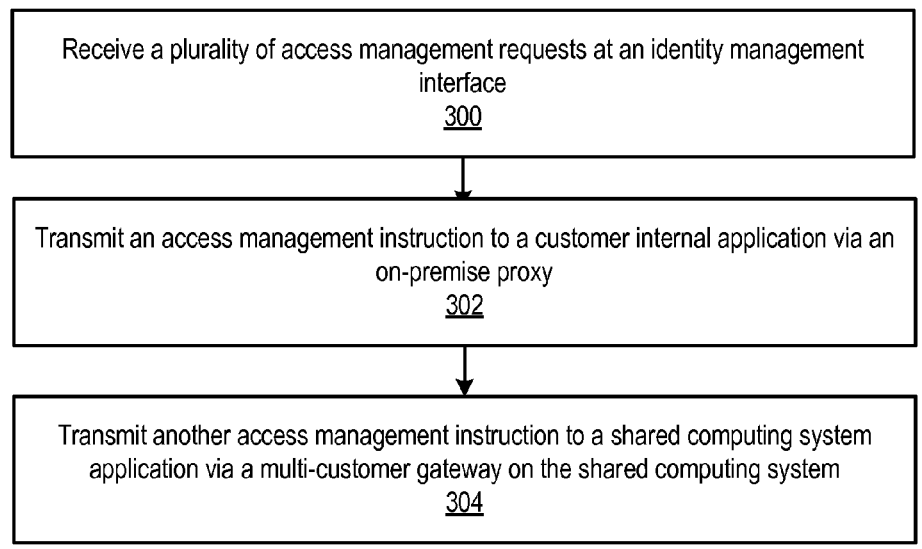
FIG. 3 is a flowchart of operations used in performing identity management with a unified management interface across internal and shared computing applications, according to some embodiments.

FIG. 3 is a flowchart of operations used in performing identity management with a unified management interface across internal and shared computing applications, according to some embodiments. A plurality of access management requests is received at an identity management interface (block 300). An access management instruction is transmitted to a customer internal application via an on-premise proxy (block 302). In some embodiments, the access management instruction performs an access management operation indicated in a request of the plurality. Another access management instruction is transmitted to a shared computing system application via a multi-customer gateway on the shared computing system (block 304). In some embodiments, the another access management instruction performs another access management operation indicated in another request of the plurality.

Figure 4:
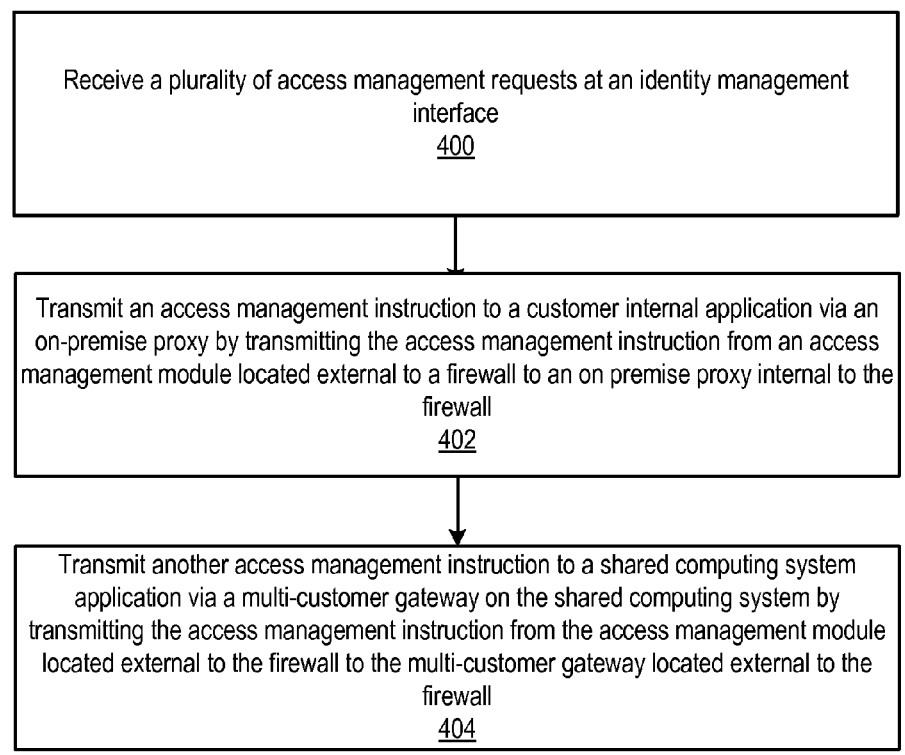
FIG. 4 is a flowchart of operations used in performing identity management with a unified management interface across internal and shared computing applications, according to some embodiments.

FIG. 4 is a flowchart of operations used in performing identity management with a unified management interface across internal and shared computing applications, according to some embodiments. A plurality of access management requests is received at an identity management interface (block 400). An access management instruction is transmitted to a customer internal application via an on-premise proxy by transmitting the access management instruction from an access management module located external to a firewall to an on premise proxy internal to the firewall (block 402). Another access management instruction is transmitted to a shared computing system application via a multi-customer gateway on the shared computing system by transmitting the access management instruction from the access management module located external to the firewall to the multi-customer gateway located external to the firewall (block 404).

Figure 5:
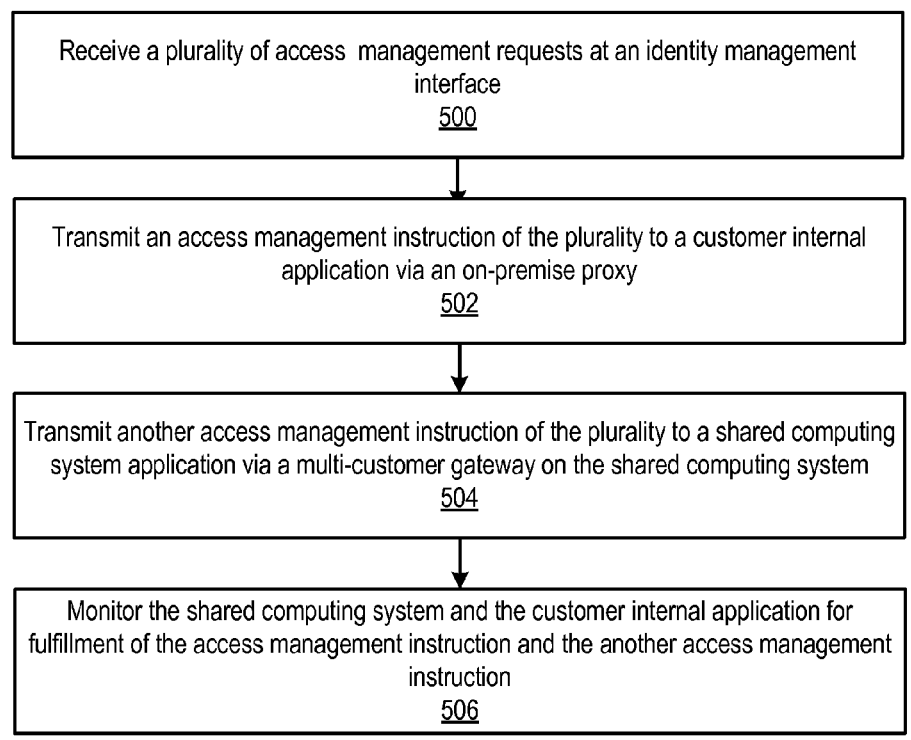
FIG. 5 is a flowchart of operations used in performing monitoring functions in identity management with a unified management interface across internal and shared computing applications, according to some embodiments.

FIG. 5 is a flowchart of operations used in performing monitoring functions in identity management with a unified management interface across internal and shared computing applications, according to some embodiments. A plurality of access management requests is received at an identity management interface (block 500). An access management instruction of the plurality is transmitted to a customer internal application via an on-premise proxy (block 502). Another access management instruction of the plurality is transmitted to a shared computing system application via a multi-customer gateway on the shared computing system (block 504). The shared computing system and the customer internal application are monitored for fulfillment of the access management instruction and the another access management instruction (block 506).

Figure 6:
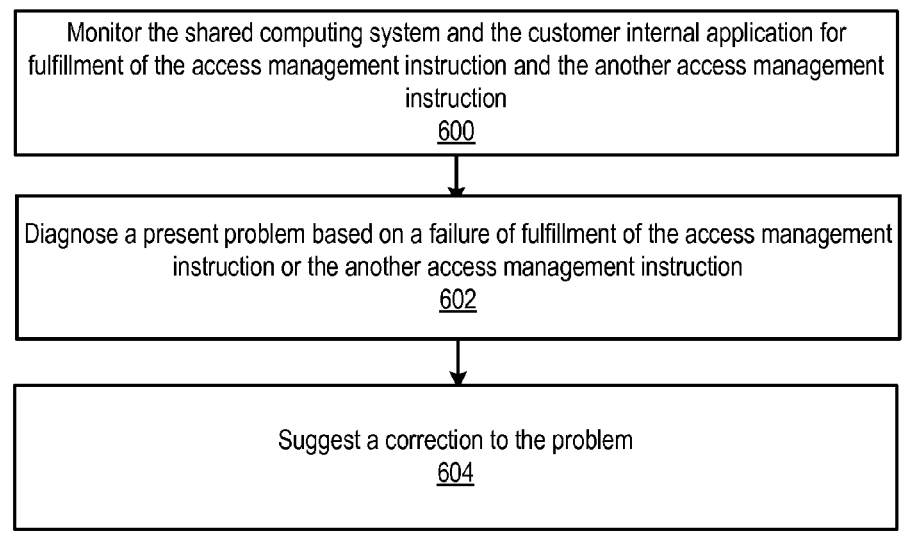
FIG. 6 is a flowchart of operations used in performing diagnostic functions in identity management with a unified management interface across internal and shared computing applications, according to some embodiments.

FIG. 6 is a flowchart of operations used in performing diagnostic functions in identity management with a unified management interface across internal and shared computing applications, according to some embodiments. The shared computing system and the customer internal application are monitored for fulfillment of the access management instruction and the another access management instruction (block 600). A present problem is diagnosed based on a failure of fulfillment of the access management instruction or the another access management instruction (block 602). A correction to the problem is suggested (block 604).

Figure 7:
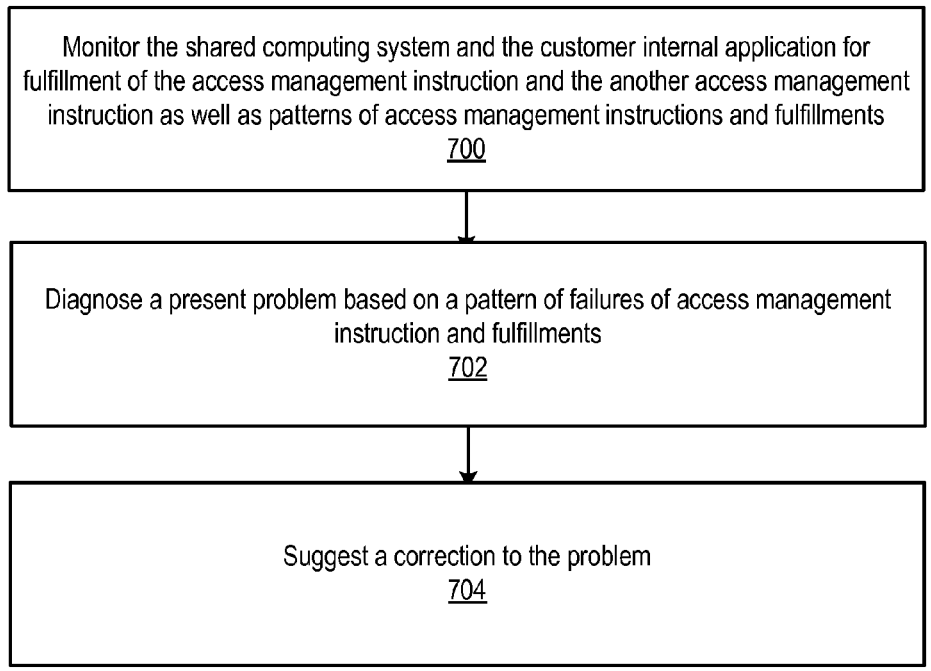
FIG. 7 is a flowchart of operations used in performing diagnostic functions in identity management with a unified management interface across internal and shared computing applications, according to some embodiments.

FIG. 7 is a flowchart of operations used in performing diagnostic functions in identity management with a unified management interface across internal and shared computing applications, according to some embodiments. The shared computing system and the customer internal application are monitored for fulfillment of the access management instruction and the another access management instruction as well as patterns of access management instructions and fulfillments (block 700). A present problem is diagnosed based on a pattern of failures of access management instruction and fulfillments (block 702). A correction to the problem is suggested (block 704).

Figure 8:
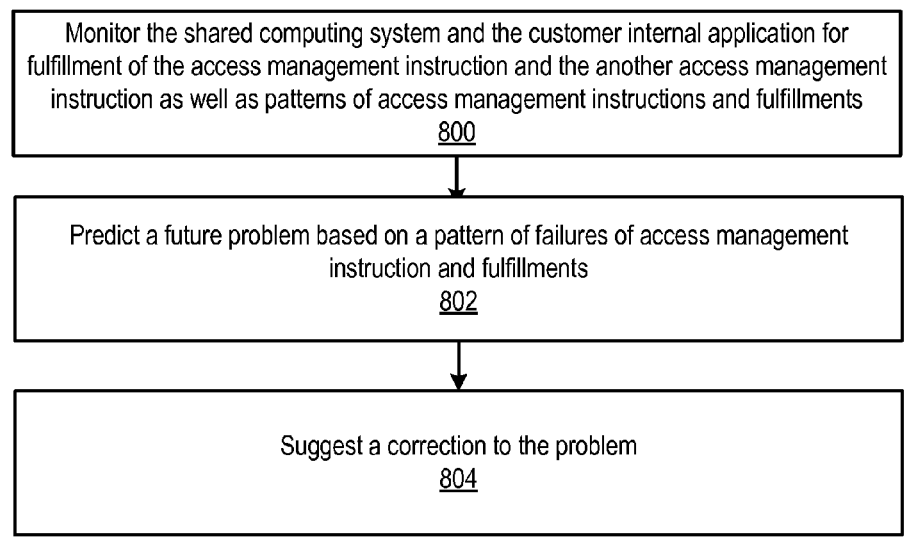
FIG. 8 is a flowchart of operations used in performing predictive diagnostic functions in identity management with a unified management interface across internal and shared computing applications, according to some embodiments.

FIG. 8 is a flowchart of operations used in performing predictive diagnostic functions in identity management with a unified management interface across internal and shared computing applications, according to some embodiments. The shared computing system and the customer internal application are monitored for fulfillment of the access management instruction and the another access management instruction as well as patterns of access management instructions and fulfillments (block 800). A future problem based on a pattern of failures of access management instruction and fulfillments (block 802). A correction to the problem is suggested (block 804).

Figure 9:
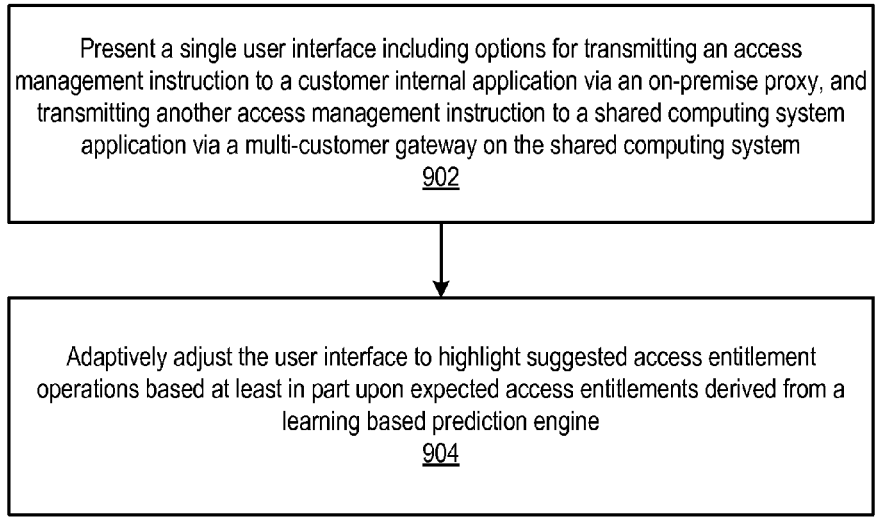
FIG. 9 is a flowchart of operations used in performing predictive functions in identity management with a unified management interface across internal and shared computing applications, according to some embodiments.

FIG. 9 is a flowchart of operations used in performing predictive functions in identity management with a unified management interface across internal and shared computing applications, according to some embodiments. A single user interface including options for transmitting an access management instruction to a customer internal application via an on-premise proxy, and transmitting another access management instruction to a shared computing system application via a multi-customer gateway on the shared computing system is presented (block 900). The user interface is adaptively adjusted to highlight suggested access entitlement operations based at least in part upon expected access entitlements derived from a prediction engine (block 902).

Figure 10:
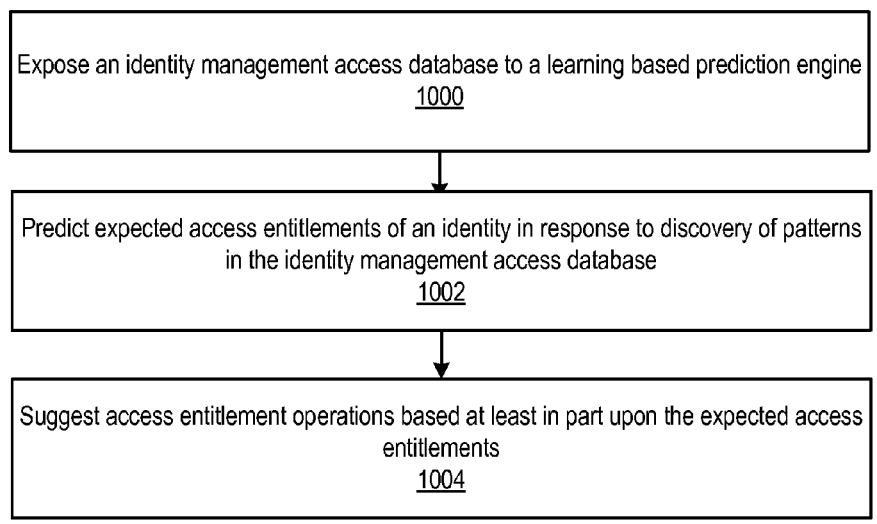
FIG. 10 is a flowchart of operations used in performing adaptive user interface functions in identity management with a unified management interface across internal and shared computing applications, according to some embodiments.

FIG. 10 is a flowchart of operations used in performing adaptive user interface functions in identity management with a unified management interface across internal and shared computing applications, according to some embodiments. An identity management access database is exposed to a prediction engine (block 1000). Expected access entitlements of an identity are predicted in response to discovery of patterns in the identity management access database (block 1002). Access entitlement operations are suggested based at least in part upon the expected access entitlements (block 1004).

Figure 11:
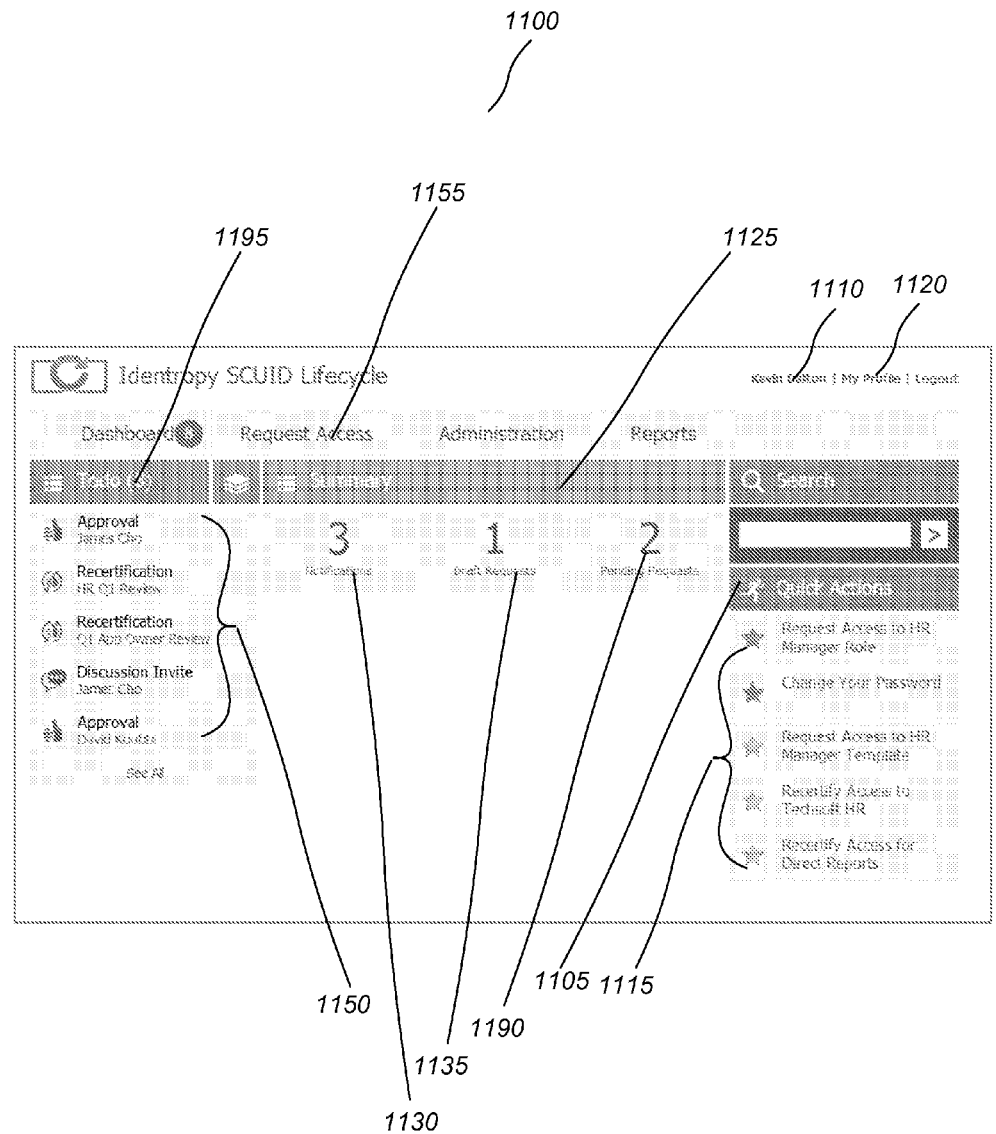
FIG. 11 is a graphical user interface for performing adaptive user interface functions in identity management with a unified management interface across internal and shared computing applications, according to some embodiments.

FIG. 11 is a graphical user interface for performing adaptive user interface functions in identity management with a unified management interface across internal and shared computing applications, according to some embodiments. User interface 1100 is a dashboard interface. Upon presentation, user interface 1100 presents a quick actions toolbar 1105, which immediately informs the user listed in a user identity segment 1110 of suggested (quick) actions 1115, which are suggested based upon recommendations from a recommendation engine. This is based on the end user's identity data, as reported in a profile that can be accessed through a profile control 1120 and past behavior (most frequently used actions). Examples of profile data can include a user's name, title and department, direct reports, with links to access their profiles. A summary notification presents notification of events requiring user action, such notifications 1130, draft requests 1135, and pending requests 1140. A todo list 1145 is presented, showing various items 1150 requiring user attention. User interface 1100 also includes a control for accessing an access request interface 1155, which triggers display of the screen shown in FIG. 12.

Figure 12:
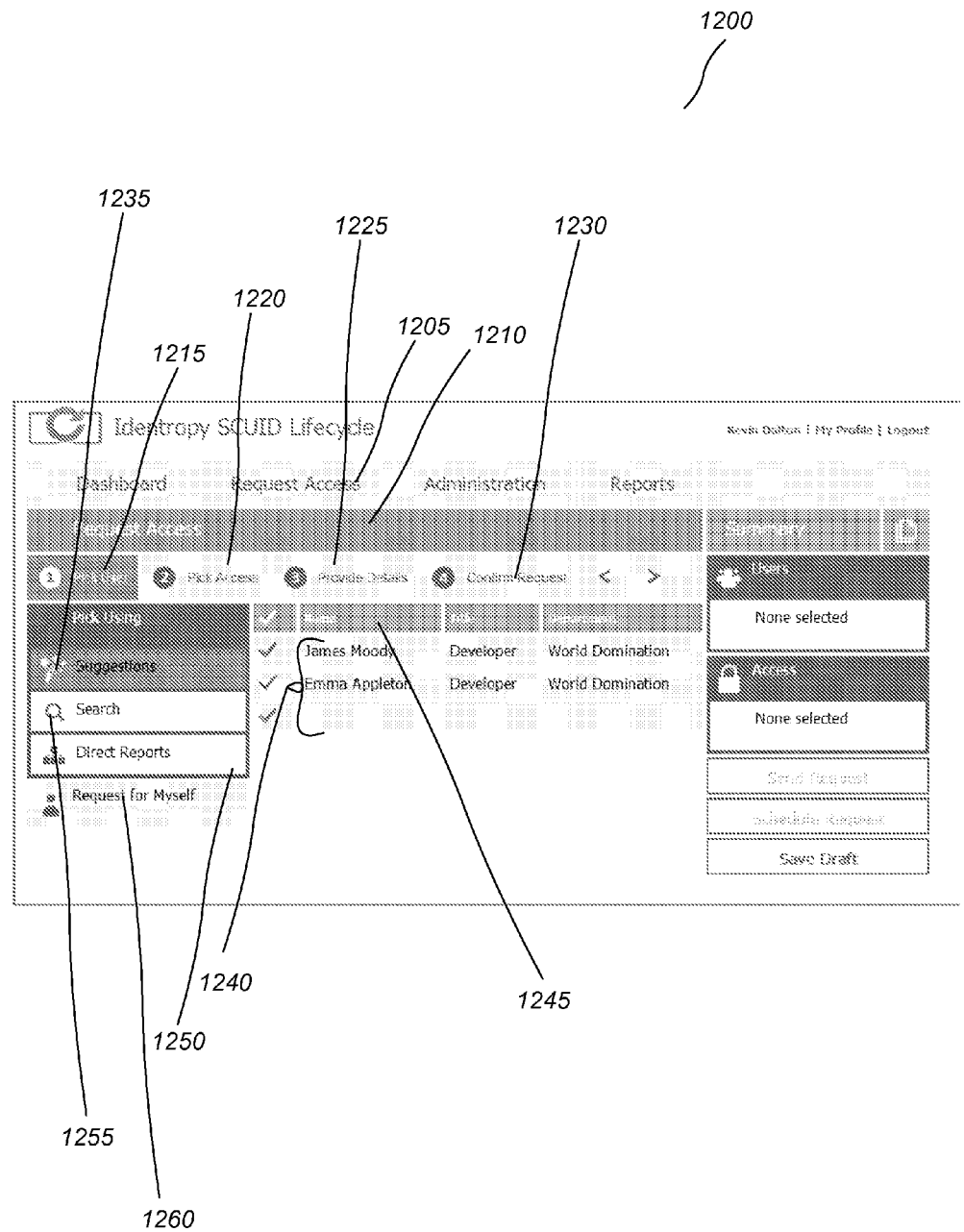
FIG. 12 is a graphical user interface for performing adaptive user interface functions in identity management with a unified management interface across internal and shared computing applications, according to some embodiments.

FIG. 12 is a graphical user interface for performing adaptive user interface functions in identity management with a unified management interface across internal and shared computing applications, according to some embodiments. Upon presentation in response to actuation of a control for accessing an access request interface 1205, user interface 1200 presents an access request interface 1210 for processing through a control for selecting a user 1215, a control for selecting access 1220, a control for providing details 1225, and a control for confirming an access request 1230. When the user actuates the suggestions control 1235 in the access request interface 1210, the recommendation engine determines, based on the end user's identity data, as well as behavioral patterns over the last interactions, who are the most likely users for which the end user (the requester) may want to request access. The most likely users 1240 are presented in a user list 1245. A user is also able to request a list of direct reports through a direct reports control 1250, to search for a particular user with a search control 1255, or to request access for the user through a request for myself control 1260.

In some embodiments, access request interface 1210 performs adaptively adjusting the user interface to highlight suggested access entitlement operations based at least in part upon interactions between search criteria, browsing of categories, user identity and/or past behavior. In some embodiments, access request interface 1210 performs adaptively adjusting the user interface 1200 to highlight suggested access entitlement operations by adaptively adjusting the user interface 1600 such that, when the user clicks on suggestions 1235, in access request interface 1210, the recommendation engine determines, based on the end user's identity data, as well as behavioral patterns over the last interactions, who are the most likely users for which the end user may want to request access in a user list 1245.

Figure 13:
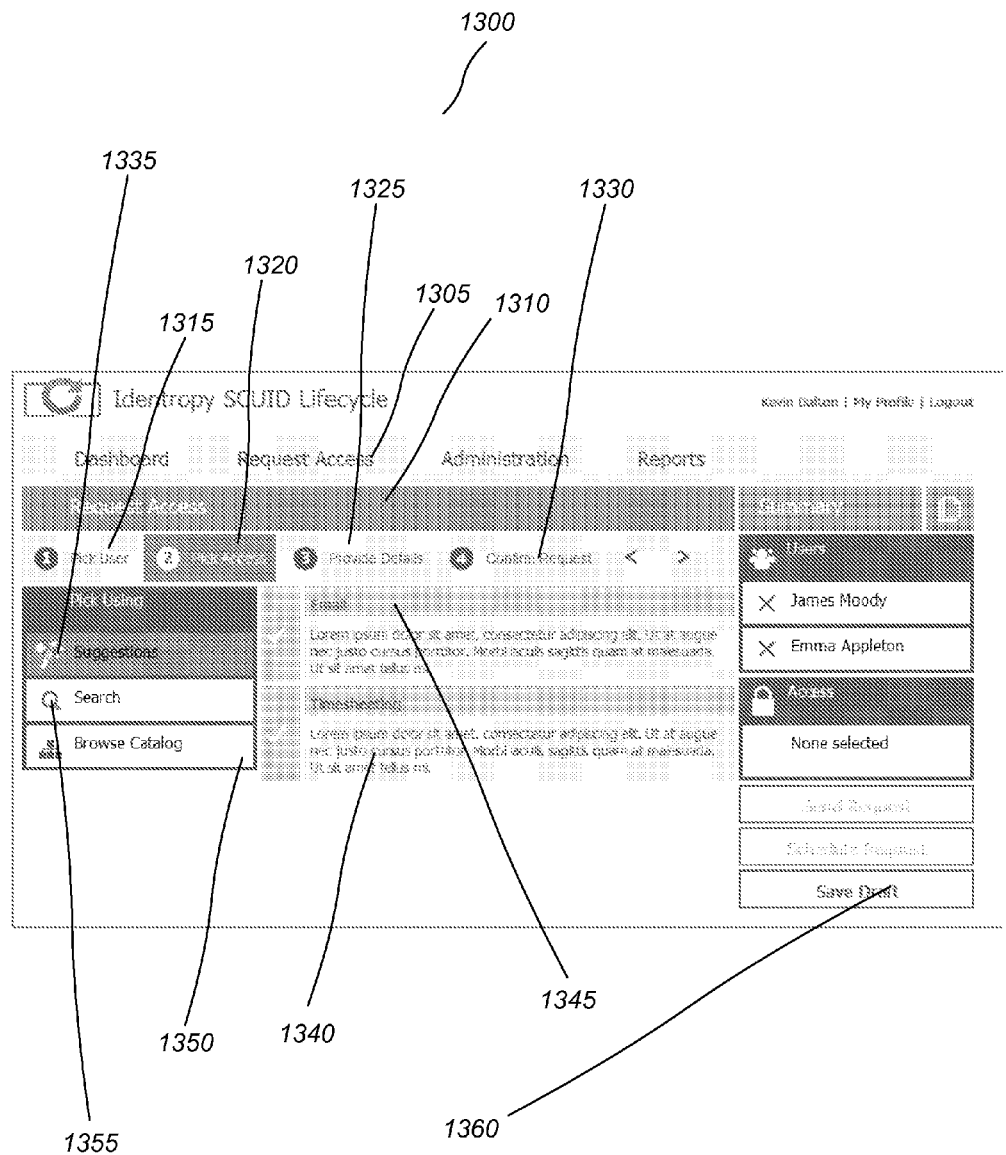
FIG. 13 is a graphical user interface for performing adaptive user interface functions in identity management with a unified management interface across internal and shared computing applications, according to some embodiments.

FIG. 13 is a graphical user interface for performing adaptive user interface functions in identity management with a unified management interface across internal and shared computing applications, according to some embodiments. Upon presentation in response to actuation of a control for accessing an access request interface 1305, user interface 1300 presents an access request interface 1310 for processing through a control for selecting a user 1315, a control for selecting access 1320, a control for providing details 1325, and a control for confirming an access request 1330. After selecting two users on behalf which to make the request, the requester clicks on suggestions 1335, and the recommendation engine determines the most likely entitlements that the requester would want to request based on requester's identity data, target users (requestees) identity data and behavioral patterns (i.e. based on last requests). In this case timesheeting 1340 and email 1345 are suggested. A catalog of entitlements may be browsed using a browse catalog control 1350, or a search may be performed using a search control 1355. After a completion of entry details, a draft may be saved using a save draft control 1360.

Responsive to receiving a plurality of access management requests 1340 and 1345 at an identity management interface (user interface 1300), an identity management module will transmit an access management instruction to a customer internal application via an on-premise proxy and transmit another access management instruction to a shared computing system application via a multi-customer gateway on the shared computing system, as described herein.

Figure 14:
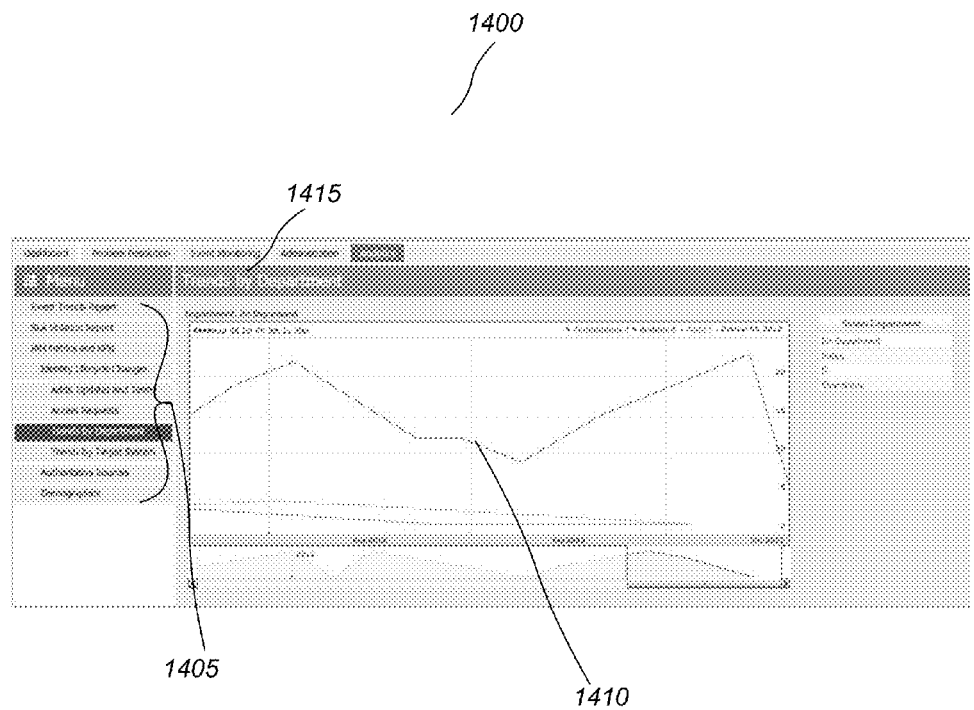
FIG. 14 is a graphical user interface for displaying data in a system performing adaptive user interface functions in identity management with a unified management interface across internal and shared computing applications, according to some embodiments.

FIG. 14 is a graphical user interface showing a metric used for suggesting an access entitlement in a system performing adaptive user interface functions in identity management with a unified management interface across internal and shared computing applications, according to some embodiments. User interface 1400 presents reporting options 1405 for displaying data 1410 related to behavioral patterns of system users, which data can be used for adaptively adjusting a user interface to highlight suggested access entitlement operations based at least in part upon expected access entitlements derived from a prediction engine. A tool for showing trends by department 1415 is displayed.

In some embodiments, data 1410 is used for adaptively adjusting the user interface to highlight suggested access entitlement operations by adaptively adjusting the user interface based at least in part upon user identity and past behavior, where affiliation with a particular department is one example of identity. Data can likewise be organized by target system, provisioning trends, location demographics, employee title demographics, cost center demographics, source availability trends, types of operations being performed, timing of requests for various forms of access, or other significant indicators of trends. In some embodiments, data 1410 is used to facilitate adaptively adjusting the user interface such that, when the user clicks on suggestions, in the access request interface, the recommendation engine determines, based on the end user's identity data, as well as behavioral patterns over the last interactions, who are the most likely users for which the end user may want to request access. In some embodiments, data 1410 is used for adaptively adjusting the user interface to highlight suggested access entitlement operations based at least in part upon expected access entitlements derived from a prediction engine by adaptively adjusting the user interface to highlight suggested access entitlement operations based on a neural networks prediction engine accessing runtime-data to make predictions based on changes in usage patterns.

In some embodiments, data 1410 is used for adaptively adjusting the user interface to highlight suggested access entitlement operations based at least in part upon expected access entitlements derived from a prediction engine by presenting a next selected operation based on patterns in an identity management access database discerned by a learning-based prediction engine. In some embodiments, data 1410 is used for adaptively adjusting the user interface to highlight suggested access entitlement operations based at least in part upon expected access entitlements derived from a prediction engine by presenting a next selected operation based on auditing an identity management access database using a learning-based prediction engine to assess priority of operations that can be performed by a user of the user interface.

Figure 15:
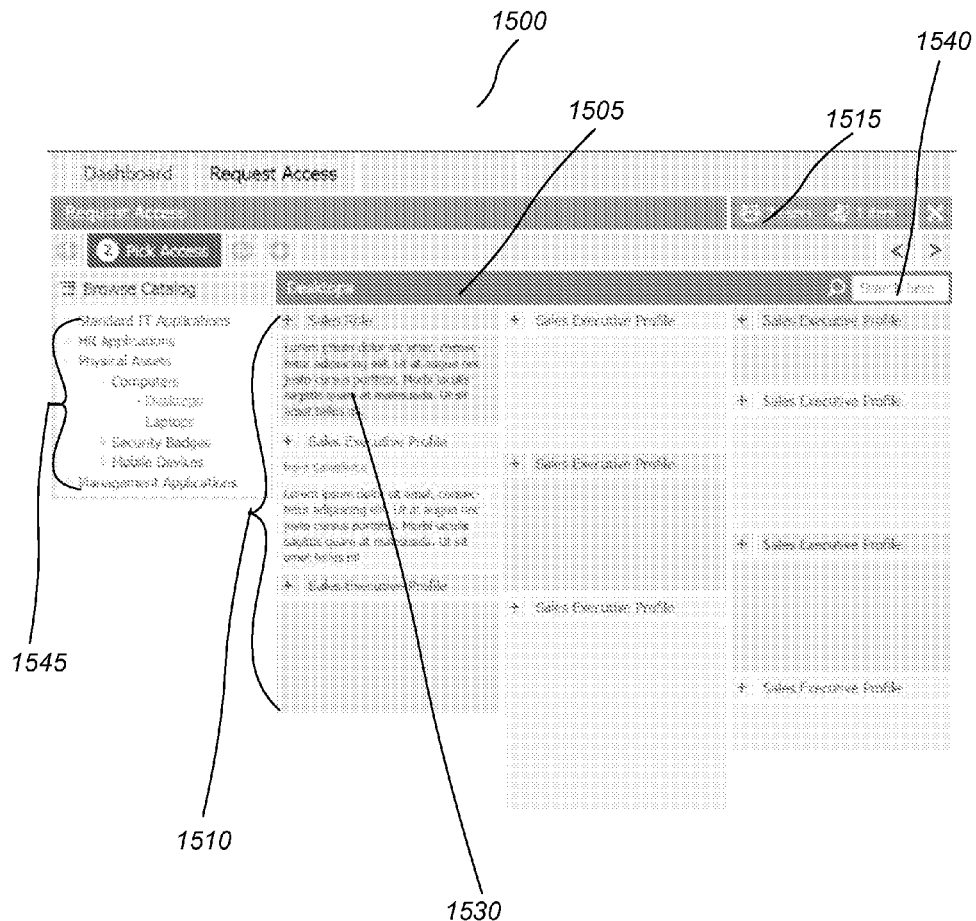
FIG. 15 is a graphical user interface for requesting an access entitlement in a system performing adaptive user interface functions in identity management with a unified management interface across internal and shared computing applications, according to some embodiments.

FIG. 15 is a graphical user interface for requesting an access entitlement in a system performing adaptive user interface functions in identity management with a unified management interface across internal and shared computing applications, according to some embodiments. A user interface 1500 provides a browsing pane 1505 listing options for requesting access entitlements 1510. Sales role entitlement 1530, which sets up access on a Salesforce.com™ account, is one example of an option for transmitting another access management instruction to a shared computing system application via a multi-customer gateway on the shared computing system.

In some embodiments, browsing pane 1505 performs adaptively adjusting the user interface to highlight suggested access entitlement operations (options for requesting access entitlements 1510) based at least in part upon expected access entitlements derived from a prediction engine. For example, options for requesting access entitlements 1510 may be displayed in browsing pane 1505 or positioned for display in browsing pane 1505 based on frequency or recency of use by the user of user interface 1500. As such, the adaptively adjusting the user interface 1500 to highlight suggested access entitlement operations may include adaptively adjusting the user interface based at least in part upon user identity and/or past behavior.

In some embodiments, adjusting the user interface based at least in part upon user identity includes adjusting the user interface based at least in part upon the user identity of the user being prompted to select access entitlements. In some embodiments, adjusting the user interface based at least in part upon user identity includes adjusting the user interface based at least in part upon user identity of the persons for whom access is being selected. In some embodiments, identity adjusting the user interface based at least in part upon user identity includes individual personality of the identity, while in some embodiments, identity includes adjusting the user interface based at least in part upon user identity includes adjusting the user interface based at least in part upon shared attributes, such as demographics, commonly performed actions, or trends applicable to users based on shared characteristics.

In some embodiments, adjusting the user interface based at least in part upon past behavior includes adjusting the user interface based at least in part upon the past behavior of the user being prompted to select access entitlements. In some embodiments, adjusting the user interface based at least in part upon past behavior includes adjusting the user interface based at least in part upon past behavior of the persons for whom access is being selected. In some embodiments, identity adjusting the user interface based at least in part upon past behavior includes adjusting the user interface based at least in part upon shared attributes, such as demographics, commonly performed actions, or trends applicable to users based on shared characteristics of past behavior.

In some embodiments, a search box 1540 and a set of browsing category controls 1545 are provided. Entry of a search string into search box 1540 causes options for requesting access entitlements 1510 complying with the search string to be displayed in browsing pane 1505. Likewise, actuation of one of browsing category controls 1545 causes options for requesting access entitlements 1510 of the represented category to be displayed in browsing pane 1505. In some embodiments, interaction between requests from search box 1540 and a set of browsing category controls 1545 are supported. For example, if a user enters a search string in search box 1540 and then actuates one of browsing category controls 1545, results to be displayed in browsing pane 1505 are filtered first according to the search string and then according to the selected category. A reverse option where searching is performed after category filtering is also supported. For example, if a user enters a search string in search box 1540 after the user actuates one of browsing category controls 1545, results to be displayed in browsing pane 1505 are filtered first according to the selected category and then according to the search string. Likewise, options for requesting access entitlements 1510 may be displayed in browsing pane 1505 or positioned for display in browsing pane 1505 based on frequency of use by the user of user interface 1500 after such a dual-filtering operation.

In some embodiments, browsing pane 1505 performs adaptively adjusting the user interface 1500 to highlight suggested access entitlement operations based at least in part upon expected access entitlements 1510 derived from a prediction engine by adaptively adjusting the user interface 1500 to highlight suggested access entitlement operations 1510 based on a neural networks prediction engine accessing runtime-data to make predictions based on changes in usage patterns. In some embodiments, browsing pane 1505 performs adaptively adjusting the user interface 1500 to highlight suggested access entitlement operations 1510 based at least in part upon expected access entitlements derived from a prediction engine by presenting a next selected operation based on patterns in an identity management access database discerned by a learning-based prediction engine. In some embodiments, browsing pane 1505 performs adaptively adjusting the user interface 1500 to highlight suggested access entitlement operations 1510 based at least in part upon expected access entitlements derived from a prediction engine by presenting a next selected operation based on auditing an identity management access database using a learning-based prediction engine to assess priority of operations that can be performed by a user of the user interface.

Figure 16:
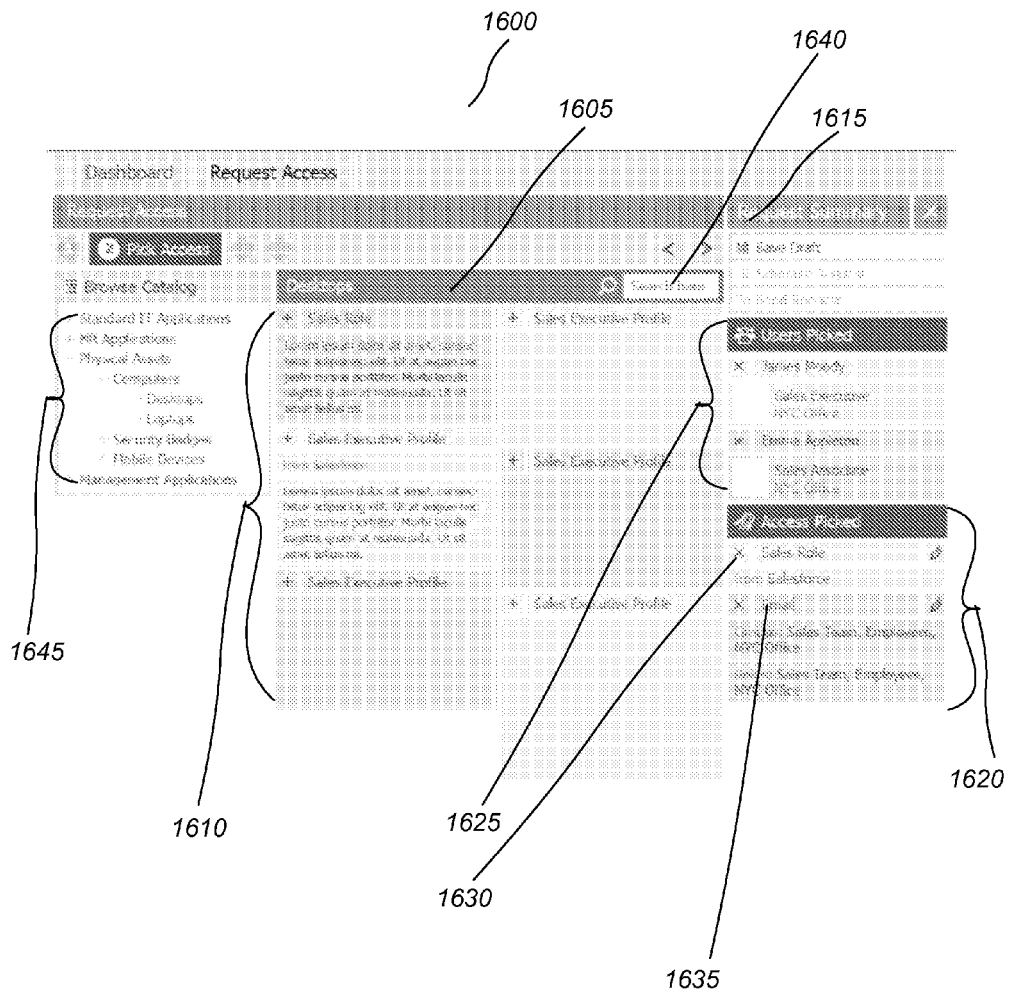
FIG. 16 is a graphical user interface for requesting an access entitlement in a system performing adaptive user interface functions in identity management with a unified management interface across internal and shared computing applications, according to some embodiments.
Figure 17:
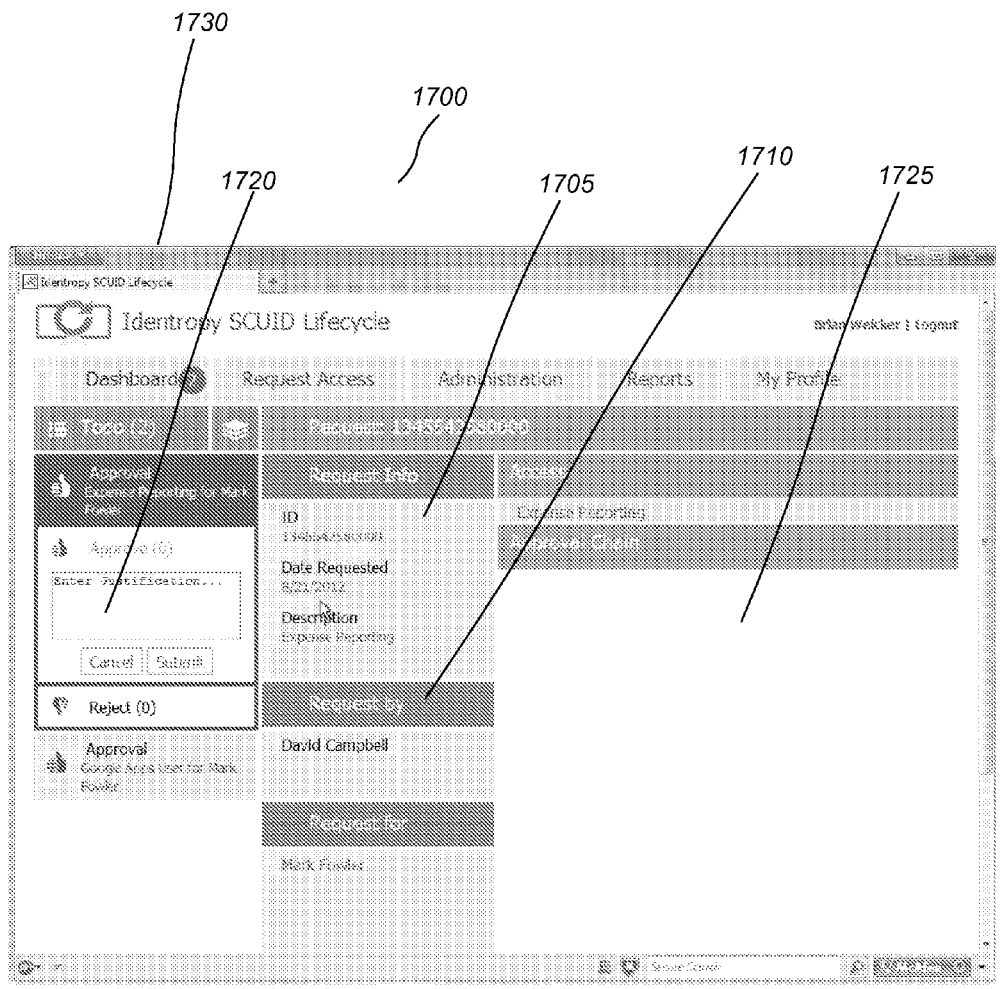
FIG. 17 is a graphical user interface for approving an access entitlement in a system performing adaptive user interface functions in identity management with a unified management interface across internal and shared computing applications, according to some embodiments.

FIG. 16 is a graphical user interface for requesting an access entitlement in a system performing adaptive user interface functions in identity management with a unified management interface across internal and shared computing applications, according to some embodiments. A user interface 1600 provides a browsing pane 1605 listing options for requesting access entitlements 1610. A summary pane 1615 lists access entitlements requested 1620 as well as users for which an entitlement is requested 1625. Access entitlements requested 1620 include both options for transmitting an access management instruction to a customer internal application via an on-premise proxy, and options for transmitting another access management instruction to a shared computing system application via a multi-customer gateway on the shared computing system. Sales role entitlement 1630, which sets up access on a Salesforce.com™ account, is one example of an option for transmitting another access management instruction to a shared computing system application via a multi-customer gateway on the shared computing system. Email entitlement 1635, which sets up access on a local email server, is one example of an option for transmitting an access management instruction to a customer internal application via an on-premise proxy.

In some embodiments, browsing pane 1605 performs adaptively adjusting the user interface to highlight suggested access entitlement operations (options for requesting access entitlements 1610) based at least in part upon expected access entitlements derived from a prediction engine. For example, options for requesting access entitlements 1610 may be displayed in browsing pane 1605 or positioned for display in browsing pane 1605 based on frequency of use by the user of user interface 1600. As such, the adaptively adjusting the user interface 1600 to highlight suggested access entitlement operations may include adaptively adjusting the user interface based at least in part upon user identity and/or past behavior.

In some embodiments, adjusting the user interface based at least in part upon user identity includes adjusting the user interface based at least in part upon the user identity of the user being prompted to select access entitlements. In some embodiments, adjusting the user interface based at least in part upon user identity includes adjusting the user interface based at least in part upon user identity of the persons for whom access is being selected. In some embodiments, identity adjusting the user interface based at least in part upon user identity includes individual personality of the identity, while in some embodiments, identity includes adjusting the user interface based at least in part upon user identity includes adjusting the user interface based at least in part upon shared attributes, such as demographics, commonly performed actions, or trends applicable to users based on shared characteristics.

In some embodiments, adjusting the user interface based at least in part upon past behavior includes adjusting the user interface based at least in part upon the past behavior of the user being prompted to select access entitlements. In some embodiments, adjusting the user interface based at least in part upon past behavior includes adjusting the user interface based at least in part upon past behavior of the persons for whom access is being selected. In some embodiments, identity adjusting the user interface based at least in part upon past behavior includes adjusting the user interface based at least in part upon shared attributes, such as demographics, commonly performed actions, or trends applicable to users based on shared characteristics of past behavior.

In some embodiments, a search box 1640 and a set of browsing category controls 1645 are provided. Entry of a search string into search box 1640 causes options for requesting access entitlements 1610 complying with the search string to be displayed in browsing pane 1605. Likewise, actuation of one of browsing category controls 1645 causes options for requesting access entitlements 1610 of the represented category to be displayed in browsing pane 1605. In some embodiments, interaction between requests from search box 1640 and a set of browsing category controls 1645 are supported. For example, if a user enters a search string in search box 1640 and then actuates one of browsing category controls 1645, results to be displayed in browsing pane 1605 are filtered first according to the search string and then according to the selected category. A reverse option where searching is performed after category filtering is also supported. For example, if a user enters a search string in search box 1640 after the user actuates one of browsing category controls 1645, results to be displayed in browsing pane 1605 are filtered first according to the selected category and then according to the search string. Likewise, options for requesting access entitlements 1610 may be displayed in browsing pane 1605 or positioned for display in browsing pane 1605 based on frequency of use by the user of user interface 1600 after such a dual-filtering operation.

In some embodiments, browsing pane 1605 performs presenting the single user interface 1600 including the options for transmitting the access management instruction to the customer internal application (email entitlement 1635) via the on-premise proxy, and the transmitting the another access management instruction to the shared computing system application (sales role entitlement 1630) via the multi-customer gateway on the shared computing system by presenting the user interface 1600 in a platform-agnostic fashion such that user controls do not a user of the single user interface 1600 as to whether a particular option invokes transmission to a shared computing system or a customer internal application.

In some embodiments, browsing pane 1605 performs adaptively adjusting the user interface 1600 to highlight suggested access entitlement operations based at least in part upon expected access entitlements 1610 derived from a prediction engine by adaptively adjusting the user interface 1600 to highlight suggested access entitlement operations 1610 based on a neural networks prediction engine accessing runtime-data to make predictions based on changes in usage patterns. In some embodiments, browsing pane 1605 performs adaptively adjusting the user interface 1600 to highlight suggested access entitlement operations 1610 based at least in part upon expected access entitlements derived from a prediction engine by presenting a next selected operation based on patterns in an identity management access database discerned by a learning-based prediction engine. In some embodiments, browsing pane 1605 performs adaptively adjusting the user interface 1600 to highlight suggested access entitlement operations 1610 based at least in part upon expected access entitlements derived from a prediction engine by presenting a next selected operation based on auditing an identity management access database using a learning-based prediction engine to assess priority of operations that can be performed by a user of the user interface.

FIG. 17 is a graphical user interface for approving an access entitlement in a system performing adaptive user interface functions in identity management with a unified management interface across internal and shared computing applications, according to some embodiments. User interface 1700 provides details of a request 1705. Requests may be presented in an order selected as a part of presenting a next selected operation based on patterns in an identity management access database discerned by a learning-based prediction engine. User interface 1700 provides details of requesting party and provides an interface for providing an approval 1720 and justification for the approval. If multiple approvals are required, an approval chain area 1725 may display the set of multiple approvals required. In some embodiments, user interface is presented in a web browser window 1730, which is capable of being displayed on any platform supporting web browser execution, ranging from full-size computers to dedicated terminals or mobile phones or tablets. In other embodiments, a standalone application (or app) may be provided.

Figure 18:
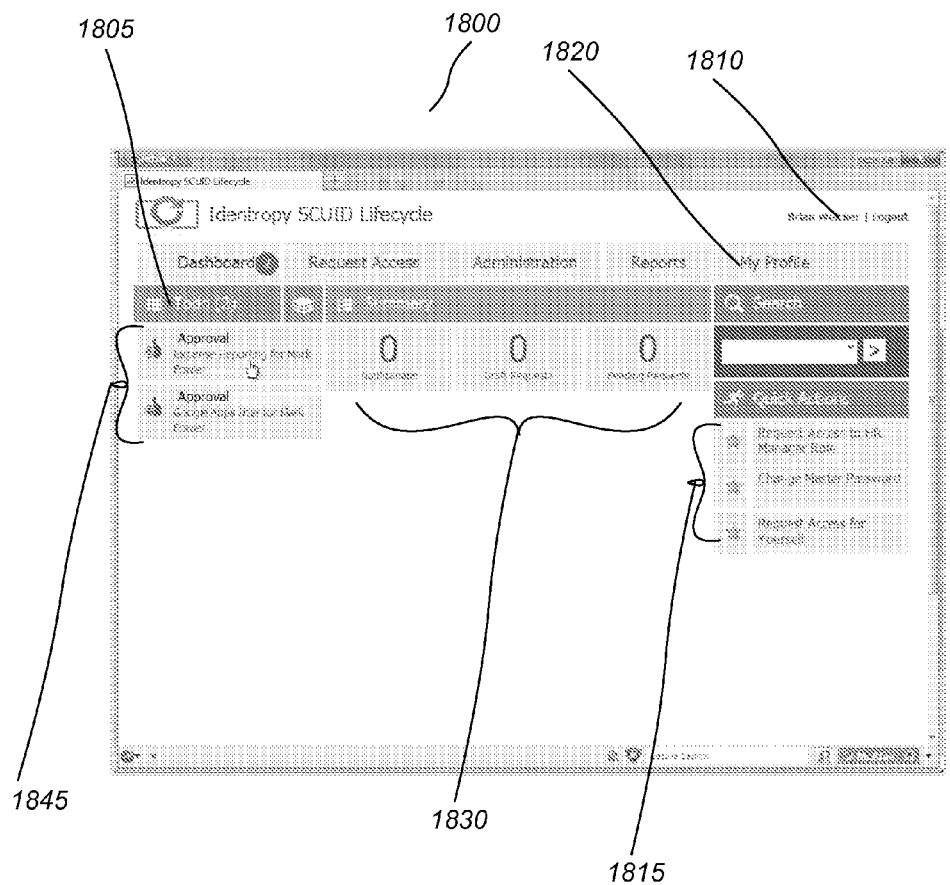
FIG. 18 is a graphical user interface for managing access entitlements in a system performing adaptive user interface functions in identity management with a unified management interface across internal and shared computing applications, according to some embodiments.

FIG. 18 is a graphical user interface for managing access entitlements in a system performing adaptive user interface functions in identity management with a unified management interface across internal and shared computing applications, according to some embodiments. Upon presentation, user interface 1800 presents a quick actions toolbar 1805, which immediately informs the user listed in a user identity segment 1810 of suggested (quick) actions 1815, which are suggested based upon recommendations from a recommendation engine. This is based on the end user's identity data, as reported in a profile that can be accessed through a profile control 1820 and past behavior (most frequently used actions). Examples of profile data can include a user's name, title and department, direct reports, with links to access their profiles. A summary notification 1830 presents notification of events requiring user action, such notifications, draft requests, and pending requests. A todo list 1845 is presented, showing various items requiring user attention.

In some embodiments, user interface 1800 is presented to a user of an identity management module. In some embodiments the user interface is a single user interface including options (suggested (quick) actions 1815) for transmitting an access management instruction to a customer internal application via an on-premise proxy, and transmitting another access management instruction to a shared computing system application via a multi-customer gateway on the shared computing system. In some embodiments, the user interface is adaptively adjusted to highlight suggested access entitlement operations (suggested (quick) actions 1815 or todo list 1845) based at least in part upon expected access entitlements derived from a prediction engine.

In some embodiments, the adaptively adjusting the user interface to highlight suggested access entitlement operations further includes adaptively adjusting the user interface based at least in part upon user identity 1810 and past behavior. In some embodiments, the adaptively adjusting the user interface to highlight suggested access entitlement operations (suggested (quick) actions 1815 or todo list 1845) further comprises adaptively adjusting the user interface such that, when the user clicks on suggestions (suggested (quick) actions 1815 or todo list 1845), in the access request interface, the recommendation engine determines, based on the end user's identity data, as well as behavioral patterns over the last interactions, who are the most likely users for which the end user (the requester) may want to request access.

In some embodiments, the adaptively adjusting the user interface 1800 to highlight suggested access entitlement operations further includes the presenting the single user interface including the options for transmitting the access management instruction to the customer internal application via the on-premise proxy, and the transmitting the another access management instruction to the shared computing system application via the multi-customer gateway on the shared computing system further includes presenting the user interface in a platform-agnostic fashion such that user controls do not inform a user of the single user interface as to whether a particular option invokes transmission to a shared computing system or a customer internal application.

In some embodiments, the adaptively adjusting the user interface 1800 to highlight suggested access entitlement operations based at least in part upon expected access entitlements derived from a prediction engine further includes adaptively adjusting the user interface 1800 to highlight suggested access entitlement operations based on a neural networks prediction engine accessing runtime-data to make predictions based on changes in usage patterns.

Example System

Figure 19:
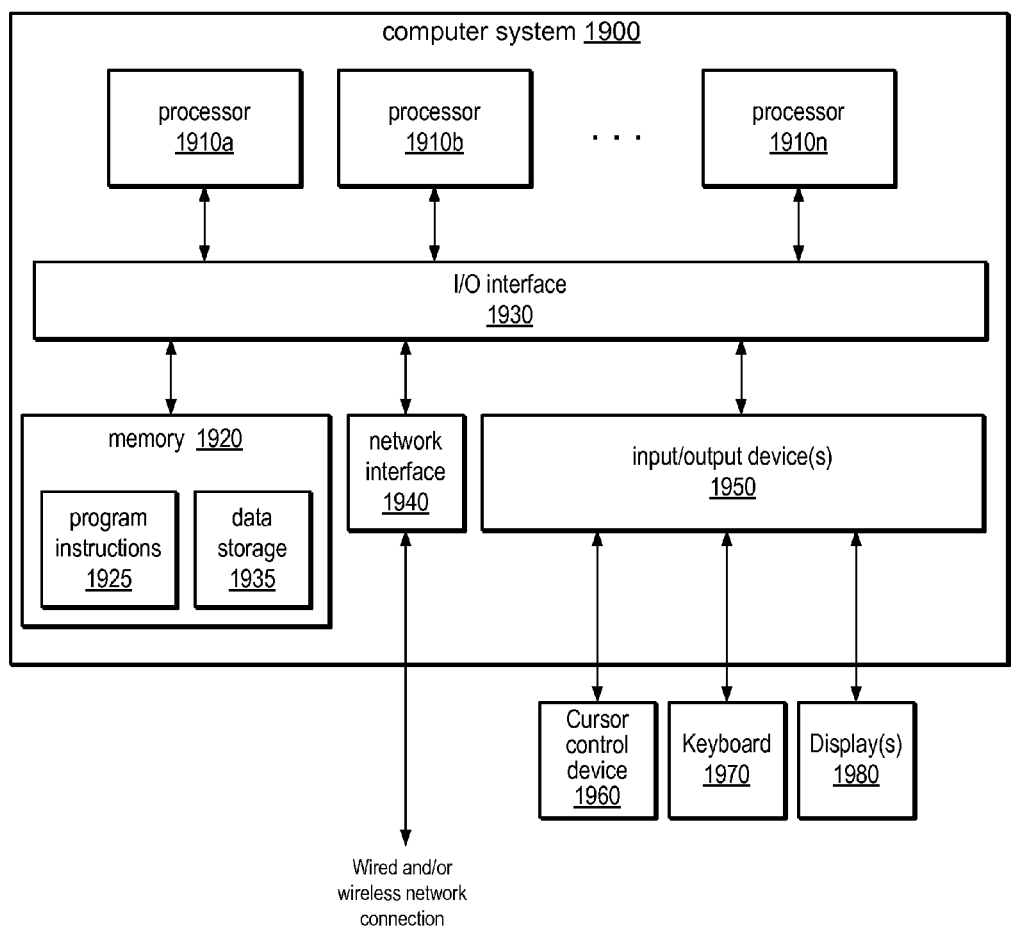
FIG. 19 illustrates an example computer system that may be used in embodiments.

Embodiments of an identity management module and/or of the various identity management techniques as described herein may be executed on one or more computer systems, which may interact with various other devices. One such computer system is illustrated by FIG. 19. In different embodiments, computer system 1900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1900 includes one or more processors 1910 coupled to a system memory 1920 via an input/output (I/O) interface 1930. Computer system 1900 further includes a network interface 1940 coupled to I/O interface 1930, and one or more input/output devices 1950, such as cursor control device 1960, keyboard 1970, and display(s) 1980. In some embodiments, it is contemplated that embodiments may be implemented using a single instance of computer system 1900, while in other embodiments multiple such systems, or multiple nodes making up computer system 1900, may be configured to host different portions or instances of embodiments. For example, in one embodiment some elements may be implemented via one or more nodes of computer system 1900 that are distinct from those nodes implementing other elements.

In various embodiments, computer system 1900 may be a uniprocessor system including one processor 1910, or a multiprocessor system including several processors 1910 (e.g., two, four, eight, or another suitable number). Processors 1910 may be any suitable processor capable of executing instructions. For example, in various embodiments, processors 1910 may be general-purpose or embedded processors implementing any of a variety of instruction set architectures (ISAs), such as the x86, PowerPC, SPARC, or MIPS ISAs, or any other suitable ISA. In multiprocessor systems, each of processors 1910 may commonly, but not necessarily, implement the same ISA.

System memory 1920 may be configured to store program instructions and/or data accessible by processor 1910. In various embodiments, system memory 1920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an identity management module are shown stored within system memory 1920 as program instructions 1925 and data storage 1935, respectively. In other embodiments, program instructions and/or data may be received, sent or stored upon different types of computer-accessible media or on similar media separate from system memory 1920 or computer system 1900. Generally speaking, a computer-accessible medium may include storage media or memory media such as magnetic or optical media, e.g., disk or CD/DVD-ROM coupled to computer system 1900 via I/O interface 1930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1940.

In one embodiment, I/O interface 1930 may be configured to coordinate I/O traffic between processor 1910, system memory 1920, and any peripheral devices in the device, including network interface 1940 or other peripheral interfaces, such as input/output devices 1950. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. In addition, in some embodiments some or all of the functionality of I/O interface 1930, such as an interface to system memory 1920, may be incorporated directly into processor 1910.

Network interface 1940 may be configured to allow data to be exchanged between computer system 1900 and other devices attached to a network, such as other computer systems, or between nodes of computer system 1900. In various embodiments, network interface 1940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1950 may, in some embodiments, include one or more display terminals, keyboards, keypads, touchpads, scanning devices, voice or optical recognition devices, or any other devices suitable for entering or retrieving data by one or more computer system 1900. Multiple input/output devices 1950 may be present in computer system 1900 or may be distributed on various nodes of computer system 1900. In some embodiments, similar input/output devices may be separate from computer system 1000 and may interact with one or more nodes of computer system 1000 through a wired or wireless connection, such as over network interface 1040.

As shown in FIG. 19, memory 1920 may include program instructions 1925, configured to implement embodiments of an identity management module as described herein, and data storage 1935, comprising various data accessible by program instructions 1925. In one embodiment, program instructions 1925 may include software elements of embodiments of an identity management module as illustrated in the above Figures. Data storage 1935 may include data that may be used in embodiments. In other embodiments, other or different software elements and data may be included.

Those skilled in the art will appreciate that computer system 1900 is merely illustrative and is not intended to limit the scope of an identity management module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1900 may be transmitted to computer system 1900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising,
using one or more processors to perform presenting a user interface to a user of an identity management module, wherein
the identity management module comprises one or more tools for allowing a user to create and manage one or more accounts on each of a shared computing system application and a customer internal application, and the presenting comprises:
presenting a single user interface including options for
transmitting an access management instruction for creating or managing one of the one or more accounts to the customer internal application via an on-premise proxy, and
transmitting another access management instruction for creating or managing one of the one or more accounts to the shared computing system application via a multi-customer gateway on the shared computing system; and
adaptively adjusting the user interface to highlight suggested access entitlement operations for creating or managing one of the one or more accounts based at least in part upon expected access entitlements derived from a learning based prediction engine, wherein
the adaptively adjusting the user interface to highlight suggested access entitlement operations comprises suggesting an access entitlement operation based at least in part on auditing one or more existing identities in an identity management database to detect access anomalies based on comparing existing access entitlements of a selected identity to existing access entitlements of others of the existing identities, and
the adaptively adjusting the user interface to highlight suggested access entitlement operations further comprises suggesting an access entitlement operation based at least in part on a hybrid prediction approach combining collaborative filtering and content based filtering.

2. The method of claim 1, wherein the adaptively adjusting the user interface to highlight suggested access entitlement operations further comprises adaptively adjusting the user interface based at least in part upon user identity and past behavior.

3. The method of claim 1, wherein the adaptively adjusting the user interface to highlight suggested access entitlement operations further comprises adaptively adjusting the user interface such that, when the user clicks on suggestions, in the access request interface, the recommendation engine determines, based on the end user's identity data, as well as behavioral patterns over the last interactions, who are the most likely users for which the end user may want to request access.

4. The method of claim 1, wherein the presenting the single user interface including the options for transmitting the access management instruction to the customer internal application via the on-premise proxy, and the transmitting the another access management instruction to the shared computing system application via the multi-customer gateway on the shared computing system further comprise presenting the user interface in a platform-agnostic fashion such that user controls do not a user of the single user interface as to whether a particular option invokes transmission to a shared computing system or a customer internal application.

5. The method of claim 1, wherein the adaptively adjusting the user interface to highlight suggested access entitlement operations based at least in part upon expected access entitlements derived from a prediction engine further comprises adaptively adjusting the user interface to highlight suggested access entitlement operations based on a neural networks prediction engine accessing runtime-data to make predictions based on changes in usage patterns.

6. The method of claim 1, wherein the adaptively adjusting the user interface to highlight suggested access entitlement operations based at least in part upon expected access entitlements derived from a prediction engine further comprises presenting a next selected operation based on patterns in identity management access database discerned by a learning-based prediction engine.

7. The method of claim 1, wherein the adaptively adjusting the user interface to highlight suggested access entitlement operations based at least in part upon expected access entitlements derived from a prediction engine further comprises presenting a next selected operation based on auditing an identity management access database using a learning-based prediction engine to assess priority of operations that can be performed by a user of the user interface.

8. A system, comprising:
at least one processor; and
a memory comprising program instructions, wherein the program instructions are executable by the at least one processor to:
present a user interface to a user of an identity management module, wherein
the identity management module comprises one or more tools for allowing a user to create and manage one or more accounts on each of a shared computing system application and a customer internal application, and
the program instructions executable by the at least one processor to present the user interface comprise:
program instructions executable by the at least one processor to present a single user interface including options for
transmitting an access management instruction for creating or managing one of the one or more accounts to the customer internal application via an on-premise proxy, and
transmitting another access management instruction for creating or managing one of the one or more accounts to the shared computing system application via a multi-customer gateway on the shared computing system; and
program instructions executable by the at least one processor to adaptively adjust the user interface to highlight suggested access entitlement operations for creating or managing one of the one or more accounts based at least in part upon expected access entitlements derived from a prediction engine, wherein
the program instructions executable by the at least one processor to adaptively adjust the user interface to highlight suggested access entitlement operations comprise program instructions executable by the at least one processor to suggest an access entitlement operation based at least in part on auditing one or more existing identities in an identity management database to detect access anomalies based on comparing existing access entitlements of a selected identity to existing access entitlements of others of the existing identities, and
program instructions executable by the at least one processor to adaptively adjust the user interface to highlight suggested access entitlement operations further comprise program instructions executable by the at least one processor to suggest an access entitlement operation based at least in part on a hybrid prediction approach combining collaborative filtering and content based filtering.

9. The system of claim 8, wherein the program instructions executable by the at least one processor to adaptively adjust the user interface to highlight suggested access entitlement operations further comprise program instructions executable by the at least one processor to adaptively adjust the user interface based at least in part upon user identity and past behavior.

10. The system of claim 8, wherein the program instructions executable by the at least one processor to adaptively adjust the user interface to highlight suggested access entitlement operations further comprise program instructions executable by the at least one processor to adaptively adjust the user interface such that, when the user clicks on suggestions, in the access request interface, the recommendation engine determines, based on the end user's identity data, as well as behavioral patterns over the last interactions, who are the most likely users for which the end user may want to request access.

11. The system of claim 8, wherein the program instructions executable by the at least one processor to present the single user interface including the options for transmitting the access management instruction to the customer internal application via the on-premise proxy, and transmit the another access management instruction to the shared computing system application via the multi-customer gateway on the shared computing system further comprise program instructions executable by the at least one processor to present the user interface in a platform-agnostic fashion such that user controls do not alert a user of the single user interface as to whether a particular option invokes transmission to a shared computing system or a customer internal application.

12. The system of claim 8, wherein the program instructions executable by the at least one processor to adaptively adjust the user interface to highlight suggested access entitlement operations based at least in part upon expected access entitlements derived from a prediction engine further comprise program instructions executable by the at least one processor to adaptively adjust the user interface to highlight suggested access entitlement operations based on a neural networks prediction engine accessing runtime-data to make predictions based on changes in usage patterns.

13. The system of claim 8, wherein the program instructions executable by the at least one processor to adaptively adjust the user interface to highlight suggested access entitlement operations based at least in part upon expected access entitlements derived from a prediction engine further comprise program instructions executable by the at least one processor to present a next selected operation based on patterns in identity management access database discerned by a learning-based prediction engine.

14. The system of claim 8, wherein the program instructions executable by the at least one processor to adaptively adjust the user interface to highlight suggested access entitlement operations based at least in part upon expected access entitlements derived from a prediction engine further comprise program instructions executable by the at least one processor to present a next selected operation based on auditing an identity management access database using a learning-based prediction engine to assess priority of operations that can be performed by a user of the user interface.

15. A non-transitory computer-readable storage medium storing program instructions, wherein the program instructions are computer-executable to implement:
presenting a user interface to a user of an identity management module, wherein
the identity management module comprises one or more tools for allowing a user to create and manage one or more accounts on each of a shared computing system application and a customer internal application, and
the presenting comprises:
presenting a single user interface including options for
transmitting an access management instruction for creating or managing one of the one or more accounts to the customer internal application via an on-premise proxy, and
transmitting another access management instruction for creating or managing one of the one or more accounts to the shared computing system application via a multi-customer gateway on the shared computing system; and
adaptively adjusting the user interface to highlight suggested access entitlement operations for creating or managing one of the one or more accounts based at least in part upon expected access entitlements derived from a prediction engine, wherein
the adaptively adjusting the user interface to highlight suggested access entitlement operations comprises suggesting an access entitlement operation based at least in part on auditing one or more existing identities in an identity management database to detect access anomalies based on comparing existing access entitlements of a selected identity to existing access entitlements of others of the existing identities, and
the adaptively adjusting the user interface to highlight suggested access entitlement operations further comprises suggesting an access entitlement operation based at least in part on a hybrid prediction approach combining collaborative filtering and content based filtering.

16. The non-transitory computer-readable storage medium of claim 15, wherein the program instructions computer-executable to implement adaptively adjusting the user interface to highlight suggested access entitlement operations further comprise program instructions computer-executable to implement adaptively adjusting the user interface based at least in part upon user identity and past behavior.

17. The non-transitory computer-readable storage medium of claim 15, wherein the program instructions computer-executable to implement adaptively adjusting the user interface to highlight suggested access entitlement operations further comprise program instructions computer-executable to implement adaptively adjusting the user interface such that, when the user clicks on suggestions, in the access request interface, the recommendation engine determines, based on the end user's identity data, as well as behavioral patterns over the last interactions, who are the most likely users for which the end user may want to request access.

18. The non-transitory computer-readable storage medium of claim 15, wherein the program instructions computer-executable to implement presenting the single user interface including the options for transmitting the access management instruction to the customer internal application via the on-premise proxy, and the transmitting the another access management instruction to the shared computing system application via the multi-customer gateway on the shared computing system further comprise program instructions computer-executable to implement presenting the user interface in a platform-agnostic fashion such that user controls do not a user of the single user interface as to whether a particular option invokes transmission to a shared computing system or a customer internal application.

19. The non-transitory computer-readable storage medium of claim 15, wherein the adaptively adjusting the user interface to highlight suggested access entitlement operations based at least in part upon expected access entitlements derived from a prediction engine further comprise program instructions computer-executable to implement adaptively adjusting the user interface to highlight suggested access entitlement operations based on a neural networks prediction engine accessing runtime-data to make predictions based on changes in usage patterns.

20. The non-transitory computer-readable storage medium of claim 15, wherein the program instructions computer-executable to implement adaptively adjusting the user interface to highlight suggested access entitlement operations based at least in part upon expected access entitlements derived from a prediction engine further comprise program instructions computer-executable to implement presenting a next selected operation based on patterns in identity management access database discerned by a learning-based prediction engine.

21. The non-transitory computer-readable storage medium of claim 15, wherein the adaptively adjusting the user interface to highlight suggested access entitlement operations based at least in part upon expected access entitlements derived from a prediction engine further comprise program instructions computer-executable to implement presenting a next selected operation based on auditing an identity management access database using a learning-based prediction engine to assess priority of operations that can be performed by a user of the user interface.

\* \* \* \* \*